US012795088B2

(12) United States Patent
Andersson et al.

(10) Patent No.: US 12,795,088 B2
(45) Date of Patent: Nov. 10, 2026

(54) DECISION PROCESS FOR EXTRA-LONG DEBLOCKING FILTERS

(71) Applicant: Telefonaktiebolaget LM Ericsson (publ), Stockholm (SE)

(72) Inventors: Kenneth Andersson, Gävle (SE); Jack Enhorn, Bålsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/875,014

(22) PCT Filed: Apr. 26, 2023

(86) PCT No.: PCT/EP2023/061006

§ 371 (c)(1),
(2) Date: Dec. 13, 2024

(87) PCT Pub. No.: WO2024/002552

PCT Pub. Date: Jan. 4, 2024

(65) Prior Publication Data

US 2025/0365407 A1 Nov. 27, 2025

Related U.S. Application Data

(60) Provisional application No. 63/357,172, filed on Jun. 30, 2022.

(51) Int. Cl.
*H04N 19/117* (2014.01)
*H04N 19/14* (2014.01)
(Continued)

(52) U.S. Cl.
CPC ........... *H04N 19/117* (2014.11); *H04N 19/14* (2014.11); *H04N 19/176* (2014.11); *H04N 19/184* (2014.11); *H04N 19/80* (2014.11)

(58) Field of Classification Search
CPC .... H04N 19/117; H04N 19/14; H04N 19/176; H04N 19/184; H04N 19/80; H04N 19/82
(Continued)

(56) References Cited

U.S. PATENT DOCUMENTS

RE43,709 E * 10/2012 Hong ..................... H04N 19/80 382/268
10,075,731 B2 * 9/2018 Srinivasan ........... H04N 19/129
(Continued)

FOREIGN PATENT DOCUMENTS

EP 2 728 870 A1 5/2014
JP 7549088 B2 * 9/2024
(Continued)

OTHER PUBLICATIONS

Z. Lei, S. Reddy, V. Cherepanov and Z. Deng, "GPGPU implementation of VP9 in-loop deblocking filter and improvements for AV1 codec," 2017 IEEE International Conference on Image Processing (ICIP), Beijing, China, 2017, pp. 925-929 (Year: 2017).*
(Continued)

*Primary Examiner* — Justin W Rider
(74) *Attorney, Agent, or Firm* — ROTHWELL, FIGG, ERNST & MANBECK, P.C.

(57) ABSTRACT

A method for deblocking is provided. The method includes checking whether a current block is smooth. The method includes checking whether an adjacent block is smooth. The method includes determining that a criteria is true. The criteria comprises (1) one or more of the current block and the adjacent block being smooth and (2) first and second differences being less than a threshold. The first difference is a difference between a first average value of the current block and a second average value of the adjacent block and the second difference is a difference between a third average value of the current block and a fourth average value of the
(Continued)

adjacent block. The method includes, as a result of determining that the criteria is true, applying a long-tap deblocking across the boundary of the current block. A length of the long-tap deblocking is greater than or equal to 15.

7 Claims, 7 Drawing Sheets

(51) Int. Cl.
*H04N 19/176* (2014.01)
*H04N 19/184* (2014.01)
*H04N 19/80* (2014.01)

(58) Field of Classification Search
USPC .................................................... 375/240.24
See application file for complete search history.

(56) References Cited

U.S. PATENT DOCUMENTS

| | | | | |
|---|---|---|---|---|
| 12,382,032 | B2 * | 8/2025 | Andersson | H04N 19/176 |
| 2009/0161947 | A1 * | 6/2009 | Choki | H04N 19/14<br>375/E7.076 |
| 2009/0226085 | A1 * | 9/2009 | Shiraishi | H04N 1/58<br>382/167 |
| 2009/0279808 | A1 * | 11/2009 | Shiraishi | G06T 5/70<br>382/275 |
| 2011/0261880 | A1 * | 10/2011 | Auyeung | H04N 19/176<br>375/E7.243 |
| 2018/0131968 | A1 * | 5/2018 | Mukherjee | H04N 19/136 |
| 2019/0246123 | A1 * | 8/2019 | Ström | H04N 19/86 |
| 2019/0306503 | A1 * | 10/2019 | Dong | H04N 19/117 |
| 2019/0379913 | A1 | 12/2019 | Sun et al. | |
| 2021/0297684 | A1 | 9/2021 | Park et al. | |
| 2021/0368212 | A1 * | 11/2021 | Song | H04N 19/117 |

FOREIGN PATENT DOCUMENTS

| | | | | |
|---|---|---|---|---|
| WO | 2019/137751 | A1 | 7/2019 | |
| WO | WO-2020137126 | A1 * | 7/2020 | H04N 19/159 |
| WO | 2021/043165 | A1 | 3/2021 | |
| WO | WO-2022207701 | A1 * | 10/2022 | H04N 19/176 |
| WO | WO-2024002552 | A1 * | 1/2024 | H04N 19/117 |

OTHER PUBLICATIONS

Hsu et al., "Description of SDR video coding technology proposal by MediaTek," Joint Video Experts Team (JVET) of ITU-T SG 16 WP 3 and ISO/IEC JTC 1/SC 29/WG 11, Document: JVET-J0018, 10th Meeting: San Diego, US, Apr. 10-20, 2018, 64 pages.

International Search Report and Written Opinion mailed Jun. 19, 2023 in corresponding International Application No. PCT/EP2023/061006 (12 pages).

International Search Report and Written Opinion mailed Jul. 21, 2022 in International Application No. PCT/EP2022/058406 (15 pages).

International Telecommunication Union (ITU), "Series H: Audiovisual and Multimedia Systems; Infrastructure of audiovisual services—Coding of moving video; Versatile video coding", ITU-T Telecommunications Standardization Sector of ITU, Aug. 2020, pp. 1-516, No. H.266.

Bross, B et al., "General video coding technology in responses to the joint call for proposals on video compression with capability beyond HEVC", IEEE Transactions on Circuits and Systems for Video Technology, May 2020, pp. 1226-1240, vol. 30, No. 5.

K. Andersson et al., "Non-EE2: Longer deblocking filter for luma", 27 Meeting Joint Video Experts Team (JVET) of ITU-T SG 16 WO 3 and ISO/IEC JTC 1/SC 29, Jul. 13-22, 2022, No. JVET-AA0139-v1, 4 pages.

M. Ikeda et al., "CE2: Long-tap deblocking filter for luma and chroma (CE2-2.1.6)", 11th Meeting Joint Video Experts Team (JVET) of ITU-T SG 16 WP 3 and ISO/IEC JTC 1/SC 29/WG 11, Jul. 10-18, 2018, No. JVET-K0152-v1, Ljubljana, SI, 10 pages.

M. Karczewicz et al., "VVC In-Loop Filters", IEEE Transactions on Circuits and Systems for Video Technology, Oct. 2021, pp. 3907-3925, vol. 31, No. 10.

L. Zhang et al., "Description of core experiment 2 (CE2) on in-loop filter", 10th Meeting of Joint Video Experts Team (JVET) of ITU-T SG 16 WP 3 and ISO/IEC JTC 1/SC 29/WG 11, Apr. 10-20, 2018, JVET-J1022 r2, San Diego, USA, 30 pages.

Notice of Allowance issued in U.S. Appl. No. 18/553,356 dated Mar. 26, 2025 (11 pages).

* cited by examiner

FIG. 4
402
p15,0 p14,0 p13,0 p12,0 .... p5,0 p4,0 p3,0 p2,0 p1,0 p0,0 q0,0 q1,0 q2,0 q3,0 .... q10,0 q11,0 q12,0 q13,0 q14,0 q15,0
p15,1 p14,1 p13,1 p12,1 .... p5,1 p4,1 p3,1 p2,1 p1,1 p0,1 q0,1 q1,1 q2,1 q3,1 .... q10,1 q11,1 q12,1 q13,1 q14,1 q15,1
p15,2 p14,2 p13,2 p12,2 .... p5,2 p4,2 p3,2 p2,2 p1,2 p0,2 q0,2 q1,2 q2,2 q3,2 .... q10,2 q11,2 q12,2 q13,2 q14,2 q15,2
p15,3 p14,3 p13,3 p12,3 .... p5,3 p4,3 p3,3 p2,3 p1,3 p0,3 q0,3 q1,3 q2,3 q3,3 .... q10,3 q11,3 q12,3 q13,3 q14,3 q15,3
Block P
404
Block boundary
Block Q
406

DECISION PROCESS FOR EXTRA-LONG DEBLOCKING FILTERS

CROSS REFERENCE TO RELATED APPLICATIONS

This application is a 35 U.S.C. § 371 National Stage of International Patent Application No. PCT/EP2023/061006, filed 2023 Apr. 26, claiming benefit from provisional U.S. Patent Application No. 63/357,172, filed 2022 Jun. 30, designating the United States.

TECHNICAL FIELD

This disclosure relates to coding and decoding of video sequences and/or still images, and more particularly, to decision processes for extra-long deblocking filters.

BACKGROUND

A video sequence has one or more images (also referred to herein as "pictures"). When viewed on a screen, the image consists of pixels, each pixel typically having a red, green and blue (RGB) value. However, when encoding and decoding a video sequence, the image is often not represented using RGB but typically using another color space, including but not limited to YCbCr, ICTCP, non-constant-luminance YCbCr, and constant luminance YCbCr. If one takes the example of non-constant luminance YCbCr, which is currently the most used representation, it is made up of three components, Y, Cb and Cr. It is often the case that Y, which is called luma and which roughly represents luminance, is of full resolution, whereas the two other components, Cb and Cr, called chroma, are of a smaller resolution. A typical example is a high definition (HD) video sequence containing 1920×1080 RGB pixels, which is often represented by a 1920×1080-resolution Y component, a 960×540 Cb component and a 960×540 Cr component. The elements in the components are called samples. In the example given above, there are therefore 1920×1080 samples in the Y component, and hence a direct relationship between samples and pixels. Therefore, in this document, the term pixels and samples can be used interchangeably. For the Cb and Cr components, there is no direct relationship between samples and pixels; a single Cb sample typically influences several pixels.

In the Versatile Video Coding standard (VVC) that is developed by the Joint Video Experts Team (JVET) (also referred to herein as the "VVC"), the decoding of an image is carried out in two stages; prediction coding and loop filtering. In the prediction decoding stage, the samples of the components (Y, Cb and Cr) are partitioned into rectangular blocks. As an example, one block may be of size 4×8 samples, whereas another block may be of size 64×64 samples. The decoder obtains instructions for how to obtain a prediction for each block, for instance to copy samples from a previously decoded image (an example of temporal prediction) or copy samples from already decoded parts of the current image (an example of intra prediction), or a combination thereof. To improve this prediction, the decoder may obtain a residual, often encoded using transform coding such as discrete sine or cosine transform (DST or DCT). Transforms are extensively used to remove spatial redundancy from the prediction error from intra picture and inter picture prediction in video coding. The transform sizes have increased with the progression of video coding standards. In H.264 the maximum transform size was 16×16, in HEVC the maximum transform size was 32×32 and in VVC, the latest MPEG/ITU video coding standard, the maximum transform size is 64×64. In VVC also a secondary low frequency non-separable transform (LFNST) can be applied after the separable DCT/DST based transform. In work beyond version 1 of VVC it has been shown that increase of transform size can provide further gains in coding efficiency. This residual is added to the prediction, and the decoder can proceed to decode the next block.

The output from the prediction decoding stage is the three components Y, Cb, and Cr. However, it is possible to further improve the fidelity of these components, and this is done in the loop filtering stage. The loop filtering stage in VVC consists of three sub-stages; a deblocking filter stage, a sample adaptive offset (SAO) filter sub-stage, and an adaptive loop filter (ALF) sub-stage. In the deblocking filter sub-stage, the decoder changes Y, Cb, and Cr by smoothing edges near block boundaries when certain conditions are met. This increases perceptual quality (subjective quality) since the human visual system is very good at detecting regular edges such as block artifacts along block boundaries. In the SAO sub-stage, the decoder adds or subtracts a signaled value to samples that meet certain conditions, such as being in a certain value range (band offset SAO) or having a specific neighborhood (edge offset SAO). This can reduce ringing noise since such noise often aggregate in a certain value range or in specific neighborhoods (e.g., in local maxima). The reconstructed image component that are the result of this stage are denoted YSAO, CbSAO, CrSAO.

A well performing block-based video coding standard may make use of deblocking filtering. To handle the increase of transform size, the deblocking filter lengths were extended in VVC compared to HEVC. Here follows a description of deblocking in VVC.

In VVC, the deblocking is applied on an 4×4 grid for CUs first on vertical boundaries (CU/implicit TU/prediction sub-block boundaries) and then on horizontal boundaries (CU/implicit TU/prediction sub-block boundaries). Prediction sub-block boundaries inside a CU are filtered on an 8×8 grid. The deblocking is based on HEVC deblocking, but also has longer deblocking filters if the size orthogonal to the block boundary is equal to or larger than 32 on at least one side for luma and the other side is larger than 4, modifying at most 7 samples (reading at most 8 samples), if the size orthogonal to the block boundary is less than 32 for one side for luma it modifies at most 3 samples and reading at most 4 samples on that side, and if it is equal to or larger than 8 on both side of a boundary in chroma samples for chroma modifying at most 3 chroma samples and reading at most 4 chroma samples otherwise it modifies at most one sample and reading at most two samples on respective side of the boundary.

The deblocking edge decisions are computed for line 0 and line 3 for a 4 sample segment of the block boundary. Based on the deblocking edge decision either long deblocking filter, strong deblocking filter, or weak deblocking filter is applied for filtering lines 0 to 3 of the sample segment of the block boundary.

The following is an excerpt from VVC. This excerpt describes the decision process for luma block edges.

8.8.3.6.2 Decision Process for Luma Block Edges

[The] Inputs to this process are:

- a picture sample array recPicture,
- a location (xCb, yCb) specifying the top-left sample of the current coding block relative to the top-left sample of the current picture, a location (xBl, yBl) specifying the top-left sample of the current block relative to the top-left sample of the current coding block, a variable edgeType specifying whether a vertical (EDGE_VER) or a horizontal (EDGE_HOR) edge is filtered, a variable bS specifying the boundary filtering strength, a variable maxFilterLengthP specifying the maximum filter length, a variable maxFilterLengthQ specifying the maximum filter length.

[The] Outputs of this process are:

the variables dE, dEp and dEq containing decisions, the modified filter length variables maxFilterLengthP and maxFilterLengthQ, the variable $t_c$.

The sample values $p_{i,k}$ and $q_{j,k}$ with i=0 . . . Max(2, maxFilterLengthP), j=0 . . . Max(2, maxFilterLengthQ) and k=0 and 3 are derived as follows:

If edgeType is equal to EDGE_VER, the following applies:

$$q_{j,k} = recPicture[xCb + xBl + j][yCb + yBl + k] \tag{1256}$$

$$p_{i,k} = recPicture[xCb + xBl - i - 1][yCb + yBl + k] \tag{1257}$$

Otherwise (edgeType is equal to EDGE_HOR), the following applies:

$$q_{j,k} = recPicture[xCb + xBl + k][yCb + yBl + j] \tag{1258}$$

$$p_{i,k} = recPicture[xCb + xBl + k][yCb + yBl - i - 1] \tag{1259}$$

The variable qpOffset is derived as follows:

If sps_ladf_enabled_flag is equal to 1, the following applies:

The variable lumaLevel of the reconstructed luma level is derived as follow:

$$lumaLevel = ((p_{0,0} + p_{0,3} + q_{0,0} + q_{0,3}) >> 2), \tag{1260}$$

The variable qpOffset is set equal to sps_ladf_lowest_interval_qp_offset and modified as follows:

```
for( i = 0; i < sps_num_ladf_intervals_minus2 + 1; i++ ) {
  if( lumaLevel > SpsLadfIntervalLowerBound[ i + 1 ] )
    qpOffset = sps_ladf_qp_offset[ i ] (1261)
  else
    break
}
```

Otherwise, qpOffset is set equal to 0.

The variables $Qp_Q$ and $Qp_P$ are set equal to the $Qp_Y$ values of the coding units which include the coding blocks containing the sample $q_{0,0}$ and $p_{0,0}$, respectively.

The variable qP is derived as follows:

$$qP = ((Qp_Q + Qp_p + 1) >> 1) + qpOffset \tag{1262}$$

The value of the variable β' is determined as specified in Table 43 based on the quantization parameter Q derived as follows:

$$Q = Clip3(0, 63, qP + (\text{slice\_beta\_offset\_div2} << 1)) \tag{1263}$$

where slice_beta_offset_div2 is the value of the syntax element slice_beta_offset_div2 for the slice that contains sample $q_{0,0}$.

The variable β is derived as follows:

$$\beta = \beta' * (1 << BitDepth - 8)) \tag{1264}$$

The value of the variable $t_C$' is determined as specified in Table 43 based on the quantization parameter Q derived as follows:

$$Q = Clip3(0, 65, qP + 2 * (bS - 1) + (\text{slice\_tc\_offset\_div2} << 1)) \tag{1265}$$

where slice_tc_offset_div2 is the value of the syntax element slice_tc_offset_div2 for the slice that contains sample $q_{0,0}$.

The variable tc is derived as follows:

If BitDepth is less than 10, the following applies:

$$tc = tc' + (1 << (9 - BitDepth))) >> (10 - BitDepth) \tag{1266}$$

Otherwise (BitDepth is greater than or equal to 10), the following applies:

$$tc = BitDepth < 10 \;?\; (tc' + 2) >> (10 - BitDepth) : tc' * (1 << (BitDepth - 10)) \tag{1267}$$

The following ordered steps apply:

1. The variables dp0, dp3, dq0 and dq3 are derived as follows:

$$dp0 = \text{Abs}(p_{2,0} - 2 * p_{1,0} + p_{0,0}) \tag{1268}$$

$$dp3 = \text{Abs}(p_{2,3} - 2 * p_{1,3} + p_{0,3}) \tag{1269}$$

$$dq0 = \text{Abs}(q_{2,0} - 2 * q_{1,0} + q_{0,0}) \tag{1270}$$

$$dq3 = \text{Abs}(q_{2,3} - 2 * q_{1,3} + q_{0,3}) \tag{1271}$$

2. When maxFilterLengthP and maxFilterLengthQ both are equal to or greater than 3 the variables sp0, sq0, spq0, sp3, sq3 and spq3 are derived as follows:

$$sp0 = \text{Abs}(p_{3,0} - p_{0,0}) \tag{1272}$$

$$sq0 = \text{Abs}(q_{0,0} - q_{3,0}) \tag{1273}$$

$$spq0 = \text{Abs}(p_{0,0} - p_{0,0}) \tag{1274}$$

$$sp3 = \text{Abs}(p_{3,3} - p_{0,3}) \tag{1275}$$

-continued $$sq3 = \text{Abs}(q_{0,3} - q_{3,3}) \quad (1276)$$

$$spq3 = \text{Abs}(p_{0,3} - q_{0,3}) \quad (1277)$$

3. The variables sidePisLargeBlk and sideQisLargeBlk are set equal to 0.
4. When maxFilterLengthP is greater than 3, sidePisLargeBlk is set equal to 1.
5. When maxFilterLengthQ is greater than 3, sideQisLargeBlk is set equal to 1.
6. When edgeType is equal to EDGE_HOR and (yCb+yBl) % CtbSizeY is equal to 0, sidePisLargeBlk is set equal to 0.
7. The variables dSam0 and dSam3 are initialized to 0.
8. When sidePisLargeBlk or sideQisLargeBlk is greater than 0, the following applies:
   a. The variables dp0L, dp3L are derived and maxFilterLengthP is modified as follows:

If sidePisLargeBlk is equal to 1, the following applies:

$$dp0L = (dp0 + \text{Abs}(p_{5,0} - 2 * p_{4,0} + p_{3,0}) + 1) >> 1 \quad (1278)$$

$$dp3L = (dp3 + \text{Abs}(p_{5,3} - 2 * p_{4,3} + p_{3,3}) + 1) >> 1 \quad (1279)$$

Otherwise, the following applies:

$$dp0L = dp0 \quad (1280)$$

$$dp3L = dp3 \quad (1281)$$

$$maxFilterLengthP = 3 \quad (1282)$$

b. The variables dq0L and dq3L are derived as follows:

If sideQisLargeBlk is equal to 1, the following applies:

$$dq0L = (dq0 + \text{Abs}(q_{5,0} - 2 * q_{4,0} + q_{3,0}) + 1) >> 1 \quad (1283)$$

$$dq3L = (dq3 + \text{Abs}(q_{5,3} - 2 * q_{4,3} + q_{3,3}) + 1) >> 1 \quad (1284)$$

Otherwise, the following applies:

$$dq0L = dq0 \quad (1285)$$

$$dq3L = dq3 \quad (1286)$$

c. The variables sp0L and sp3L are derived as follows:

If maxFilterLengthP is equal to 7, the following applies:

$$sp0L = sp0 + \text{Abs}(p_{7,0} - p_{6,0} - p_{5,0} + p_{4,0}) \quad (1287)$$

$$sp3L = sp3 + \text{Abs}(p_{7,3} - p_{6,3} - p_{5,3} + p_{4,3}) \quad (1288)$$

Otherwise, the following applies:

$$sp0L = sp0 \quad (1289)$$

$$sp3L = sp3 \quad (1290)$$

d. The variables sq0L and sq3L are derived as follows:

If maxFilterLengthQ is equal to 7, the following applies:

$$sq0L = sq0 + \text{Abs}(q_{4,0} - q_{5,0} - q_{6,0} + q_{7,0}) \quad (1291)$$

$$sq3L = sq3 + \text{Abs}(q_{4,3} - q_{5,3} - q_{6,3} + q_{7,3}) \quad (1292)$$

Otherwise, the following applies:

$$sq0L = sq0 \quad (1293)$$

$$sq3L = sq3 \quad (1294)$$

e. The variables dpq0L, dpq3L, and dL are derived as follows:

$$dpq0L = dp0L + dq0L \quad (1295)$$

$$dpq3L = dp3L + dq3L \quad (1296)$$

$$\text{dL} = dpq0L + dpq3L \quad (1297)$$

f. When dL is less than β, the following ordered steps apply:
      i. The variable dpq is set equal to 2*dpq0L.
      ii. The variable sp is set equal to sp0L, the variable sq is set equal to sq0L and the variable spq is set equal to spq0.
      iii. The variables $p_0$ $p_3$ $q_0$ and $q_3$ are first initialized to 0 and then modified according to sidePisLargeBlk and sideQisLargeBlk as follows:

When sidePisLargeBlk is equal to 1, the following applies:

$$p_3 = p_{3,0} \quad (1298)$$

$$p_0 = p_{maxFilterLengthP,0} \quad (1299)$$

When sideQisLargeBlk is equal to 1, the following applies:

$$q_3 = q_{3,0} \quad (1300)$$

$$q_0 = q_{maxFilterLengthQ,0} \quad (1301)$$

iv. For the sample location (xCb+xBl, yCb+yBl), the decision process for a luma sample as specified in clause 8.8.3.6.5 is invoked with the sample values $p_0$, $p_3$, $q_0$, $q_3$, the variables dpq, sp, sq, spq, sidePisLargeBlk, sideQisLargeBlk, β and $t_c$ as inputs, and the output is assigned to the decision dSam0.
      v. The variable dpq is set equal to 2*dpq3L.
      vi. The variable sp is set equal to sp3L, the variable sq is set equal to sq3L and the variable spq is set equal to spq3.
      vii. The variables $p_0$ $p_3$ $q_0$ and $q_3$ are first initialized to 0 and are then modified according to sidePisLargeBlk and sideQisLargeBlk as follows:

When sidePisLargeBlk is equal to 1, the following applies:

$$p_3 = p_{3,3} \tag{1302}$$

$$p_0 = p_{maxFilterLengthP,3} \tag{1303}$$

When sideQisLargeBlk is equal to 1, the following applies:

$$q_3 = q_{3,3} \tag{1304}$$

$$q_0 = q_{maxFilterLengthQ,3} \tag{1305}$$

viii. When edgeType is equal to EDGE_VER for the sample location (xCb+xBl, yCb+yBl+3) or when edgeType is equal to EDGE_HOR for the sample location (xCb+xBl+3, yCb+yBl), the decision process for a luma sample as specified in clause 8.8.3.6.5 is invoked with the sample values $p_0$, $p_3$, $q_0$, $q_3$, the variables dpq, sp, sq, spq, sidePisLargeBlk, sideQisLargeBlk, β and $t_c$ as inputs, and the output is assigned to the decision dSam3.

9. The variables dE, dEp and dEq are derived as follows:

If dSam0 and dSam3 are both equal to 1, the variable dE is set equal to 3, dEp is set equal to 1, and dEq is set equal to 1.

Otherwise, the following ordered steps apply:

a. The variables dpq0, dpq3, dp, dq and d are derived as follows:

$$dpq0 = dp0 + dq0 \tag{1306}$$

$$dpq3 = dp3 + dq3 \tag{1307}$$

$$dp = dp0 + dp3 \tag{1308}$$

$$dq = dq0 + dq3 \tag{1309}$$

$$d = dpq0 + dpq3 \tag{1310}$$

b. The variables dE, dEp, dEq, sidePisLargeBlk and sideQisLargeBlk are set equal to 0.

c. When d is less than β and both maxFilterLengthP and maxFilterLengthQ are greater than 2, the following ordered steps apply:

i. The variable dpq is set equal to 2*dpq0.

ii. The variable sp is set equal to sp0, the variable sq is set equal to sq0 and the variable spq is set equal to spq0.

iii. For the sample location (xCb+xBl, yCb+yBl), the decision process for a luma sample as specified in clause 8.8.3.6.5 is invoked with the variables $p_0$, $p_3$, $q_0$, $q_3$ all set equal to 0, the variables dpq, sp, sq, spq, sidePisLargeBlk, sideQisLargeBlk, β and $t_c$ as inputs, and the output is assigned to the decision dSam0.

iv. The variable dpq is set equal to 2*dpq3.

v. The variable sp is set equal to sp3, the variable sq is set equal to sq3 and the variable spq is set equal to spq3.

vi. When edgeType is equal to EDGE_VER for the sample location (xCb+xBl, yCb+yBl+3) or when edgeType is equal to EDGE HOR for the sample location (xCb+xBl+3, yCb+yBl), the decision process for a sample as specified in clause 8.8.3.6.5 is invoked with the variables $p_0$, $p_3$, $q_0$, $q_3$ all set equal to 0, the variables dpq, sp, sq, spq, sidePisLargeBlk, sideQisLargeBlk, β and $t_c$ as inputs, and the output is assigned to the decision dSam3.

d. When d is less than β, the following ordered steps apply:

i. The variable dE is set equal to 1.

ii. When dSam0 is equal to 1 and dSam3 is equal to 1, the variable dE is set equal to 2 and both maxFilterLengthP and maxFilterLengthQ are set equal to 3.

iii. When maxFilterLengthP is greater than 1, and maxFilterLengthQ is greater than 1, and dp is less than (β+(β>>1))>>3, the variable dEp is set equal to 1.

iv. When maxFilterLengthP is greater than 1, and maxFilterLengthQ is greater than 1, and dq is less than (β+(β>>1)>>3, the variable dEq is set equal to 1.

v. When dE is equal to 1, maxFilterLengthP is set equal to 1+dEp and maxFilterLengthQ is set equal to 1+dEq.

The following is another excerpt from VVC. This excerpt describes the filtering process for luma block edges:

8.8.3.6.3 Filtering Process for Luma Block Edges

[The] Inputs to this process are:

a picture sample array recPicture, a location (xCb, yCb) specifying the top-left sample of the current coding block relative to the top-left sample of the current picture, a location (xBl, yBl) specifying the top-left sample of the current block relative to the top-left sample of the current coding block, a variable edgeType specifying whether a vertical (EDGE_VER) or a horizontal (EDGE_HOR) edge is filtered, the variables dE, dEp and dEq containing decisions, the variables maxFilterLengthP and maxFilterLengthQ containing maximum filter lengths, the variable $t_c$.

[The] Output of this process is the modified picture sample array recPicture.

Depending on the value of edgeType, the following applies:

If edgeType is equal to EDGE_VER, the following ordered steps apply:

1. The sample values $p_{i,k}$ and $q_{j,k}$ with i=0 . . . maxFilterLengthP, j=0 . . . maxFilterLengthQ and k=0 . . . 3 are derived as follows:

$$q_{j,k} = recPicture[xCb + xBl + j][yCb + yBl + k] \tag{1311}$$

$$p_{i,k} = recPicture[xCb + xBl - i - 1][yCb + yBl + k] \tag{1312}$$

2. When dE is not equal to 0 and dE is not equal to 3, for each sample location (xCb+xBl, yCb+yBl+k), k=0 . . . 3, the following ordered steps apply:

The filtering process for a luma sample using short filters as specified in clause 8.8.3.6.6 is invoked with the variables maxFilterLengthP, maxFilterLengthQ, the sample values $p_{i,k}$, $q_{j,k}$ with i=0 . . . maxFilterLengthP and j=0 . . . maxFilterLengthQ, the decision dE, the variables dEp and dEq and the variable tc as inputs, and the number of filtered samples nDp and nDq from each side of the block boundary and the filtered sample values $p_i'$ and $q_j'$ as outputs.

When nDp is greater than 0, the filtered sample values $p_i'$ with i=0 . . . nDp−1 replace the corresponding samples inside the sample array recPicture as follows:

$$recPicture[xCb+xBl-i-1][yCb+yBl+k]=p_i' \quad (1313)$$

When nDq is greater than 0, the filtered sample values $q_j'$ with j=0 . . . nDq−1 replace the corresponding samples inside the sample array recPicture as follows:

$$recPicture[xCb+xBl+j][yCb+yBl+k]=q_j' \quad (1314)$$

3. When dE is equal to 3, for each sample location (xCb+xBl, yCb+yBl+k), k=0 . . . 3, the following ordered steps apply:

The filtering process for a luma sample using long filters as specified in clause 8.8.3.6.7 is invoked with the variables maxFilterLengthP, maxFilterLengthQ, the sample values $p_{i,k}$, $q_{j,k}$ with i=0 . . . maxFilterLengthP and j=0 . . . maxFilterLengthQ, and tc as inputs and the filtered samples values pi' and qi' as outputs.

The filtered sample values $p_i'$ with i=0 . . . maxFilterLengthP−1 replace the corresponding samples inside the sample array recPicture as follows:

$$recPicture[xCb+xBl-i-1][yCb+yBl+k]=p_i' \quad (1315)$$

The filtered sample values $q_j'$ with j=0 . . . maxFilterLengthQ−1 replace the corresponding samples inside the sample array recPicture as follows:

$$recPicture[xCb+xBl+j][yCb+yBl+k]=q_j' \quad (1316)$$

Otherwise (edgeType is equal to EDGE_HOR), the following ordered steps apply:

1. The sample values $p_{i,k}$ and $q_{j,k}$ with i=0 . . . maxFilterLengthP, j=0 . . . maxFilterLengthQ and k=0 . . . 3 are derived as follows:

$$q_{j,k}=recPicture[xCb+xBl+k][yCb+yBl+j] \quad (1317)$$

$$p_{i,k}=recPicture[xCb+xBl+k][yCb+yBl-i-1] \quad (1318)$$

2. When dE is not equal to 0 and dE is not equal to 3, for each sample location (xCb+xBl+k, yCb+yBl), k=0 . . . 3, the following ordered steps apply:
   a. The filtering process for a luma sample using short filters as specified in clause 8.8.3.6.6 is invoked with the variables maxFilterLengthP, maxFilterLengthQ, the sample values $p_{i,k}$, $q_{i,k}$ with i=0 . . . maxFilterLengthP and j=0 . . . maxFilterLengthQ, the decision dE, the variables dEp and dEq, and the variable tc as inputs, and the number of filtered samples nDp and nDq from each side of the block boundary and the filtered sample values $p_i'$ and $q_j'$ as outputs.
   b. When nDp is greater than 0, the filtered sample values $p_i'$ with i=0 . . . nDp−1 replace the corresponding samples inside the sample array recPicture as follows:

$$recPicture[xCb+xBl+k][yCb+yBl-i-1]=p_i' \quad (1319)$$

c. When nDq is greater than 0, the filtered sample values $q_j'$ with j=0 . . . nDq−1 replace the corresponding samples inside the sample array recPicture as follows:

$$recPicture[xCb+xBl+k][yCb+yBl+j]=q_j' \quad (1320)$$

3. When dE is equal to 3, for each sample location (xCb+xBl+k, yCb+yBl), k=0 . . . 3, the following ordered steps apply:
   a. The filtering process for a luma sample using long filters as specified in clause 8.8.3.6.7 is invoked with the variables maxFilterLengthP, maxFilterLengthQ, the sample values $p_{i,k}$, $q_{j,k}$ with i=0 . . . maxFilterLengthP and j=0 . . . maxFilterLengthQ, and the variable tc as inputs, and the filtered sample values $p_i'$ and $q_j'$ as outputs.
   b. The filtered sample values $p_i'$ with i=0 . . . maxFilterLengthP−1 replace the corresponding samples inside the sample array recPicture as follows:

$$recPicture[xCb+xBl+k][yCb+yBl-i-1]=p_i' \quad (1321)$$

c. The filtered sample values $q_j'$ with j=0 . . . maxFilterLengthQ−1 replace the corresponding samples inside the sample array recPicture as follows:

$$recPicture[xCb+xBl+k][yCb+yBl+j]=q_j' \quad (1322)$$

The following is another excerpt from the VVC. This excerpt describes a decision process for a luma sample:

8.8.3.6.6 Decision Process for a Luma Sample

[The] Inputs to this process are:

the sample values $p_0$, $p_3$, $q_0$ and $q_3$, the variables dpq, sp, sq, spq, sidePisLargeBlk, sideQisLargeBlk, β and tc.

[The] Output of this process is the variable dSam containing a decision.

The variables sp and sq are modified as follows:

When sidePisLargeBlk is equal to 1, the following applies:

$$sp=(sp+\text{Abs}(p_3-p_0)+1)>>1 \quad (1357)$$

When sideQisLargeBlk is equal to 1, the following applies:

$$sq=(sq+\text{Abs}(q_3-q_0)+1)>>1 \quad (1358)$$

The variables sThr1 and sThr2 are is derived as follows:

If sidePisLargeBlk is equal to 1 or sideQisLargeBlk is equal to 1, the following applies:

$$sThr1 = 3 * \beta >> 5 \tag{1359}$$

$$sThr2 = \beta >> 4 \tag{1360}$$

Otherwise, the following applies:

$$sThr1 = \beta >> 3 \tag{1361}$$

$$sThr2 = \beta >> 2 \tag{1362}$$

The variable dSam is specified as follows:

If all of the following conditions are true, dSam is set equal to 1:

$dpq$ is less than $sThr2$, $sp + sq$ is less than $sThr1$, $spq$ is less than $(5 * tc + 1) >> 1$.

Otherwise, dSam is set equal to 0.

The following is another excerpt from the VVC. This excerpt describes a filtering process for a luma sample using short filters:

8.8.3.6.7 Filtering Process for a Luma Sample Using Short Filters

[The] Inputs to this process are:

- the variables maxFilterLengthP and maxFilterLengthQ,
- the sample values $p_i$ and $q_j$ with i=0 . . . maxFilterLengthP and j=0 . . . maxFilterLengthQ,
- a variable dE,
- the variables dEp and dEq containing decisions to filter samples p1 and q1, respectively,
- a variable $t_c$.

[The] Outputs of this process are:

- the number of filtered samples nDp and nDq,
- the filtered sample values $p_i$' and $q_j$' with i=0 . . . nDp−1, j=0 . . . nDq−1.

Depending on the value of dE, the following applies:

If the variable dE is equal to 2, nDp and nDq are both set equal to 3 and the following strong filtering applies:

$$p'_0 = Clip3(p_0 - 3 * tc, p_0 + 3 * tc, (p_2 + 2 * p_1 + 2 * p_0 + 2 * q_0 + q_1 + 4) >> 3) \tag{1363}$$

$$p'_1 = Clip3(p_1 - 2 * tc, p_1 + 2 * tc, (p_2 + p_1 + p_0 + q_0 + 2) >> 2) \tag{1364}$$

$$p'_2 = Clip3(p_2 - 1 * tc, p_2 + 1 * tc, (2 * p_3 + 3 * p_2 + p_1 + p_0 + q_0 + 4) >> 3) \tag{1365}$$

$$q'_0 = Clip3(q_0 - 3 * tc, q_0 + 3 * tc, (p_1 + 2 * p_0 + 2 * q_0 + 2 * q_1 + q_2 + 4) >> 3) \tag{1366}$$

$$q'_1 = Clip3(q_1 - 2 * tc, q_1 + 2 * tc, (p_0 + q_0 + q_1 + q_2 + 2) >> 2) \tag{1367}$$

$$q'_2 = Clip3(q_2 - 1 * tc, q_2 + 1 * tc, (p_0 + q_0 + q_1 + 3 * q_2 + 2 * q_3 + 4) >> 3) \tag{1368}$$

Otherwise, nDp and nDq are set both equal to 0 and the following weak filtering applies:

The following applies:

$$\Delta = (9 * (q_0 - p_0) - 3 * (q_1 - p_1) + 8) >> 4 \tag{1369}$$

When Abs(Δ) is less than $t_c$*10, the following ordered steps apply:

The filtered sample values $p_0$' and $q_0$' are specified as follows:

$$\Delta = Clip3(-tc, tc, \Delta) \tag{1370}$$

$$p'_0 = Clip1(p_0 + \Delta) \tag{1371}$$

$$p'_0 = (q_0 - \Delta) \tag{1372}$$

When dEp is equal to 1, the filtered sample value $p_1$' is specified as follows:

$$\Delta p = Clip3(-(tc >> 1), >> 1, (((p_2 + p_0 + 1) >> 1) - p_1 + \Delta) >> 1) \tag{1373}$$

$$p'_1 = Clip1(p_1 + \Delta p) \tag{1374}$$

When dEq is equal to 1, the filtered sample value $q_1$' is specified as follows:

$$\Delta q = Clip3(-(t_C >> 1)t_C >> 1, (((q_2 + q_0 + 1) >> 1) - q_i - \Delta) >> 1 \tag{1375}$$

$$q'_1 = Clip1(q_1 + \Delta q) \tag{1376}$$

nDp is set equal to dEp+1 and nDq is set equal to dEq+1.

When nDp is greater than 0 and pred_mode_plt_flag of the coding unit that includes the coding block containing the sample $p_0$ is equal to 1, nDp is set equal to 0.

When nDq is greater than 0 and pred_mode_plt_flag of the coding unit that includes the coding block containing the sample $q_0$ is equal to 1, nDq is set equal to 0.

The following is another excerpt from the VVC. This excerpt describes a filtering process for a luma sample using long filters:

8.8.3.6.8 Filtering Process for a Luma Sample Using Long Filters

[The] Inputs to this process are:

- the variables maxFilterLengthP and maxFilterLengthQ,
- the sample values $p_i$ and $q_j$ with i=0 . . . maxFilterLengthP and j=0 . . . maxFilterLengthQ,
- a variable $t_c$.

[The] Outputs of this process are:

- the filtered sample values $p_i$' and $q_j$' with i=0 . . . maxFilterLengthP−1, j=0 . . . maxFilterLengthQ−1.

The variable refMiddle is derived as follows:

If maxFilterLengthP is equal to maxFilterLengthQ and maxFilterLengthP is equal to 5, the following applies:

$$refMiddle = (p_4 + p_3 + 2*(p_2 + p_1 + p_0 + q_0 + q_1 + q_2) + q_3 + q_4 + 8) >> 4 \quad (1377)$$

Otherwise, if maxFilterLengthP is equal to maxFilterLengthQ and maxFilterLengthP is not equal to 5, the following applies:

$$refMiddle = (p_6 + p_5 + p_4 + p_3 + p_2 + p_1 + 2*(p_0 + q_0) + q_1 + q_2 + q_3 + q_4 + q_5 + q_6 + 8) \gg 4 \quad (1378)$$

Otherwise, if one of the following conditions are true,

- maxFilterLengthQ is equal to 7 and maxFilterLengthP is equal to 5,
- maxFilterLengthQ is equal to 5 and maxFilterLengthP is equal to 7, the following applies:

$$refMiddle = (p_5 + p_4 + p_3 + p_2 + 2*(p_1 + p_0 + q_0 + q_1) + q_2 + q_3 + q_4 + q_5 + 8) \gg 4 \quad (1379)$$

Otherwise, if one of the following conditions are true,

- maxFilterLengthQ is equal to 5 and maxFilterLengthP is equal to 3,
- maxFilterLengthQ is equal to 3 and maxFilterLengthP is equal to 5, the following applies:

$$refMiddle = (p_3 + p_2 + p_1 + p_0 + q_0 + q_1 + q_2 + q_3 + 4) \gg 3 \quad (1380)$$

Otherwise, if maxFilterLengthQ is equal to 7 and maxFilterLengthP is equal to 3, the following applies:

$$refMiddle = (2*(p_2 + p_1 + p_0 + q_0) + p_0 + p_1 + q_1 + q_2 + q_3 + q_4 + q_5 + q_6 + 8) \gg 4 \quad (1381)$$

Otherwise, the following applies:

$$refMiddle = (p_6 + p_5 + p_4 + p_3 + p_2 + p_1 + 2*(q_2 + q_1 + q_0 + p_0) + q_0 + q_1 + 8) \gg 4 \quad (1382)$$

The variables refP and refQ are derived as follows:

$$refP(p_{maxFilterLengtP} + p_{maxFilterLengthP-1} + 1) \gg 1 \quad (1383)$$

$$refQ = (q_{maxFilterLengtQ} + q_{maxFilterLengthQ-1} + 1) \gg 1 \quad (1384)$$

The variables $f_i$ and $t_cPD_i$ are defined as follows:
If maxFilterLengthP is equal to 7, the following applies:

$$f_{0..6} = \{59, 50, 41, 32, 23, 14, 5\} \quad (1385)$$

$$t_CPD_{0..6} = \{6, 5, 4, 3, 2, 1, 1\} \quad (1386)$$

Otherwise, if maxFilterLengthP is equal to 5, the following applies:

$$f_{0..4} = \{58, 45, 32, 19, 6\} \quad (1387)$$

$$t_CPD_{0..4} = \{6, 5, 4, 3, 2\} \quad (1388)$$

Otherwise, the following applies:

$$f_{0..2} = \{53, 32, 11\} \quad (1389)$$

$$t_CPD_{0..2} = \{6, 4, 2\} \quad (1390)$$

The variables $g_j$ and $t_cQD_j$ are defined as follows:
If maxFilterLengthQ is equal to 7, the following applies:

$$g_{0..6} = \{59, 50, 41, 32, 23, 14, 5\} \quad (1391)$$

$$t_CQD_{0..6} = \{6, 5, 4, 3, 2, 1, 1\} \quad (1392)$$

Otherwise, if maxFilterLengthQ is equal to 5, the following applies:

$$g_{0..4} = \{58, 45, 32, 19, 6\} \quad (1393)$$

$$t_CQD_{0..4} = \{6, 5, 4, 3, 2\} \quad (1394)$$

Otherwise, the following applies:

$$g_{0..2} = \{53, 32, 11\} \quad (1395)$$

$$t_CQD_{0..2} = \{6, 4, 2\} \quad (1396)$$

The filtered sample values $p_i'$ and $q_j'$ with i=0 . . . maxFilterLengthP−1 and j=0 . . . maxFilterLengthQ−1 are derived as follows:

$$p_i' = \text{Clip3}(p_i - (t_C * t_CPD_i \gg 1), p_i + (t_C * t_CPD_i \gg 1), (refMiddle * f_i + refP * (64 - f_i) + 32) \gg 6) \quad (1397)$$

$$q_j' = \text{Clip3}\left(q_j - (t_C * t_CQD_j \gg 1), q_j + (t_C * t_CQD_j \gg 1), (refMiddle * g_j + refQ * (64 - g_j) + 32) \gg 6\right) \quad (1398)$$

When pred_mode_plt_flag of the coding unit that includes the coding block containing the sample $p_i$ is equal to 1, the filtered sample value, $p_i'$ is substituted by the corresponding input sample value pi with i=0 . . . maxFilterLengthP−1.
When pred_mode_plt_flag of the coding unit that includes the coding block containing the sample $q_i$ is equal to 1, the filtered sample value, $q_i'$ is substituted by the corresponding input sample value $q_j$ with j=0 . . . maxFilterLengthQ−1.

To adapt video coding for good subjective video quality adaptive quantization parameter (QP) of the transform coefficients are deployed. One exemplarily adaptive QP method is to derive variance of a block and give a low QP to blocks with low variance and a higher QP to blocks with high variance. This enables better accuracy of smooth blocks than of blocks with lots of details. This makes more efficient use of bits where they matter most.

Previous work by the present inventors on improvements to VVC deblocking filter introduced longer filters of 15, 23, and 31 filter taps, as in this excerpt:

Then the filtered value is determined by linear interpolation between refP and refMiddle, and between refQ and refMiddle.

$$p'_{k,i} = (f_k * refMiddle + (64 - f_k) * refP + 32) \gg 6$$

$$q'_{l,i} = (g_l * refMiddle + (64 - g_l) * refQ + 32) \gg 6$$

where for a deblocking length of 31 on both sides:

$$f = g = \{63, 61, 59, 57, 55, 53, 51, 49, 46, 44, 42, 40, 38, 36, 34, 32, 30, 28, 26, 24, 22, 20, 18, 15, 13, 11, 9, 7, 5, 3, 1\};$$

for a deblocking length of 15 on both sides:

$$f = g = \{62, 58, 53, 49, 45, 41, 36, 32, 28, 23, 19, 15, 11, 6, 2\}$$

for a deblocking length of 23 on both sides:

$$f = g = \{63, 60, 57, 54, 51, 49, 46, 43, 40, 38, 35, 32, 29, 26, 24, 21, 18, 15, 13, 10, 7, 4, 1\}$$

Corresponding filter decision process the new extra-long filters where extended as follows for sp0L, sp3L, sqOL, sq3L:

For example sp0L, sp3L, sqOL and sq3L as in VVC can be extended to include samples as in this embodiment as follows:

When maxFilterLengthP is 15:

$$sp0L = sp0 + (\text{Abs}(p_{15,0} - p_{14,0} - p_{13,0} + p_{12,0}) + \text{Abs}(p_{15,0} + p_{14,0} + p_{13,0} + p_{12,0} - p_{11,0} - p_{10,0} - p_{9,0} - p_{8,0} - p_{7,0} - p_{6,0} - p_{5,0} - p_{4,0} + p_{3,0} + p_{2,0} + p_{1,0} + p_{0,0}) + 1) \gg 1 \quad (1287)$$

$$sp3L = sp3 + (\text{Abs}(p_{15,3} - p_{14,3} - p_{13,3} + p_{12,3}) + \text{Abs}(p_{15,3} + p_{14,3} + p_{13,3} + p_{12,3} - p_{11,3} - p_{10,3} - p_{9,3} - p_{8,3} - p_{7,3} - p_{6,3} - p_{5,3} - p_{4,3} + p_{3,3} + p_{2,3} + p_{1,3} + p_{0,3}) + 1) \gg 1 \quad (1288)$$

When maxFilterLengthQ is 15:

$$sp0L = sp0 + (\text{Abs}(p_{15,0} - p_{14,0} - p_{13,0} + p_{12,0}) + \text{Abs}(p_{15,0} + p_{14,0} + p_{13,0} + p_{12,0} - p_{11,0} - p_{10,0} - p_{9,0} - p_{8,0} - p_{7,0} - p_{6,0} - p_{5,0} - p_{4,0} + p_{3,0} + p_{2,0} + p_{1,0} + p_{0,0}) + 1) \gg 1 \quad (1291)$$

-continued $$sp3L = sp3 + (\text{Abs}(p_{15,3} - p_{14,3} - p_{13,3} + p_{12,3}) + \text{Abs}(p_{15,3} + p_{14,3} + p_{13,3} + p_{12,3} - p_{11,3} - p_{10,3} - p_{9,3} - p_{8,3} - p_{7,3} - p_{6,3} - p_{5,3} - p_{4,3} + p_{3,3} + p_{2,3} + p_{1,3} + p_{0,3}) + 1) \gg 1 \quad (1292)$$

Or alternatively as follows:

When maxFilterLengthP is 15:

$$sp0L = sp0 + (\text{Abs}(p_{15,0} - 2p_{14,0} - p_{13,0} + p_{12,0}) + \text{Abs}(p_{15,0} + p_{14,0} + p_{13,0} + p_{12,0} - p_{11,0} - p_{10,0} - p_{9,0} - p_{8,0} - p_{7,0} - p_{6,0} - p_{5,0} - p_{4,0} + p_{3,0} + p_{2,0} + p_{1,0} + p_{0,0}) + 1) \gg 1 \quad (1287)$$

$$sp3L = sp3 + (\text{Abs}(p_{15,3} - 2p_{14,3} - p_{13,3} + p_{12,3}) + \text{Abs}(p_{15,3} + p_{14,3} + p_{13,3} + p_{12,3} - p_{11,3} - p_{10,3} - p_{9,3} - p_{8,3} - p_{7,3} - p_{6,3} - p_{5,3} - p_{4,3} + p_{3,3} + p_{2,3} + p_{1,3} + p_{0,3}) + 1) \gg 1 \quad (1288)$$

When maxFilterLengthQ is 15:

$$sp0L = sp0 + (\text{Abs}(p_{15,0} - 2p_{14,0} - p_{13,0} + p_{12,0}) + \text{Abs}(p_{15,0} + p_{14,0} + p_{13,0} + p_{12,0} - p_{11,0} - p_{10,0} - p_{9,0} - p_{8,0} - p_{7,0} - p_{6,0} - p_{5,0} - p_{4,0} + p_{3,0} + p_{2,0} + p_{1,0} + p_{0,0}) + 1) \gg 1 \quad (1291)$$

$$sp3L = sp3 + (\text{Abs}(p_{15,3} - 2p_{14,3} - p_{13,3} + p_{12,3}) + \text{Abs}(p_{15,3} + p_{14,3} + p_{13,3} + p_{12,3} - p_{11,3} - p_{10,3} - p_{9,3} - p_{8,3} - p_{7,3} - p_{6,3} - p_{5,3} - p_{4,3} + p_{3,3} + p_{2,3} + p_{1,3} + p_{0,3}) + 1) \gg 1 \quad (1292)$$

And final decision process thresholding for extra-long filters were extended as follows:

If $(\max FilterLengthPActual == 15)$ $$\{sp0L15 = \text{Abs}(p_{15,0} - p_{11,0}) + \text{Abs}(p_{11,0} - p_{7,0})\ dp0L15 = \text{Abs}(p_{15,0} - 2 * p_{14,0} + p_{13,0}) + \text{Abs}(p_{12,0} - 2 * p_{11,0} + p_{10,0}) + \text{Abs}(p_{9,0} - p_{8,0} - p_{7,0} + p_{6,0})\ sp3L15 = \text{Abs}(p_{15,3} - p_{11,3}) + \text{Abs}(p_{11,3} - p_{7,3})\ dp3L15 = \text{Abs}(p_{15,3} - 2 * p_{14,3} + p_{13,3}) + \text{Abs}(p_{12,3} - 2 * p_{11,3} + p_{10,3}) + \text{Abs}(p_{9,3} - p_{8,3} - p_{7,3} + p_{6,3})\}$$

If $(\max FilterLengthQActual == 15)$ $$\{sp0L15 = \text{Abs}(p_{15,0} - p_{11,0}) + \text{Abs}(p_{11,0} - p_{7,0})\ dp0L15 = \text{Abs}(p_{15,0} - 2 * p_{14,0} + p_{13,0}) + \text{Abs}(p_{12,0} - 2 * p_{11,0} + p_{10,0}) + \text{Abs}(p_{9,0} - p_{8,0} - p_{7,0} + p_{6,0})\ sp3L15 = \text{Abs}(p_{15,3} - p_{11,3}) + \text{Abs}(p_{11,3} - p_{7,3})\ dp3L15 = \text{Abs}(p_{15,3} - 2 * p_{14,3} + p_{13,3}) + \text{Abs}(p_{12,3} - 2 * p_{11,3} + p_{10,3}) + \text{Abs}(p_{9,3} - p_{8,3} - p_{7,3} + p_{6,3})\}$$

If the following checks are true, deblocking with the extra-long filter is performed, maxFilterLengthP=maxFilterLengtPActual and maxFilterLengthQ=maxFilterLengthQActual, otherwise deblocking with the restricted deblocking length is performed (e.g. max deblocking length of 7):

$$sp0L15 + sq0L15 < thr1$$

$$dp0L15 + dq0L15 < thr2$$

$$sp3L15 + sq3L15 < thr1$$

$$dp3L15 + dq3L15 < thr2$$

where thr1 (in some embodiments) is equal to 3*β>>6 and thr2 (in some embodiments) is equal to β>>5.

SUMMARY

Embodiments provide extra robustness to the filter decision process on where to apply the extra-long (15 taps or more) filters. One part is to extend the check where previously the difference between the two samples on each side of a block boundary calculated to an average of all the samples within the filter area. Secondly, a restriction to the threshold parameter, $T_c$, is introduced for extra-long filter check.

The additional steps to the filter decision in disclosed embodiments improves the efficiency of the prior art longer deblocking filters. The decisions can be well aligned with the VVC design. This also improves subjective quality of encoded video.

According to a first aspect, a method for deblocking is provided. The method includes checking whether a current block is smooth. The method includes checking whether an adjacent block is smooth. The adjacent block is adjacent to a boundary of the current block. The method includes determining that a criteria is true. The criteria comprises (1) one or more of the current block and the adjacent block being smooth and (2) first and second differences being less than a threshold, wherein the first difference is a difference between a first average value of the current block and a second average value of the adjacent block and the second difference is a difference between a third average value of the current block and a fourth average value of the adjacent block. The method includes, as a result of determining that the criteria is true, applying a long-tap deblocking across the boundary of the current block. A length of the long-tap deblocking is greater than or equal to 15.

In some embodiments, the first average value (avgP0), second average value (avgQ0), third average value (avgP3), and fourth average value (avgQ3) are given by:

$$avgP0 = \frac{\sum_{i=0}^{lenP} p_{i,0}}{lenP+1},\ avgP3 = \frac{\sum_{i=0}^{lenP} p_{i,3}}{lenP+1},$$

$$avgQ0 = \frac{\sum_{i=0}^{lenQ} q_{i,0}}{lenQ+1},\text{ and } avgQ3 = \frac{\sum_{i=0}^{lenQ} q_{i,3}}{lenQ+1},$$

where lenP is equal to maxFilterLengthP, the maximum filter length of the current block, lenQ is equal to maxFilterLengthQ, the maximum filter length of the adjacent block, $p_{i,0}$ and $P_{i,3}$ refer to values in the current block indexed by i and $q_{i,0}$ and $q_{i,3}$ refer to values in the adjacent block indexed by i. In some embodiments, the first average value (avgP0), second average value (avgQ0), third average value (avgP3), and fourth average value (avgQ3) are calculated using bit shifts to avoid a division operator being used.

In some embodiments, the first average value (avgP0), second average value (avgQ0), third average value (avgP3), and fourth average value (avgQ3) are averaged over every N-th sample for a value of N and given by:

$$avgP0 = \frac{N * \sum_{i=0,N,2*N,\ldots,maxFilterLengthP} p_{i,0}}{maxFilterLengthP+1},$$

$$avgP3 = \frac{N * \sum_{i=0,N,2*N,\ldots,maxFilterLengthP} p_{i,3}}{maxFilterLengthP+1},$$

$$avgQ0 = \frac{N * \sum_{i=0,N,2*N,\ldots,maxFilterLengthQ} q_{i,0}}{maxFilterLengthQ+1},$$

$$\text{and } avgQ3 = \frac{N * \sum_{i=0,N,2*N,\ldots,maxFilterLengthQ} q_{i,3}}{maxFilterLengthQ+1},$$

where maxFilterLengthP is the maximum filter length of the current block, maxFilterLengthQ is the maximum filter length of the adjacent block, $p_{i,0}$ and $p_{i,3}$ refer to values in the current block indexed by i and $q_{i,0}$ and $q_{i,3}$ refer to values in the adjacent block indexed by i.

In some embodiments, the first average value (avgP0), second average value (avgQ0), third average value (avgP3), and fourth average value (avgQ3) are calculated using bit shifts to avoid a division operator being used. In some embodiments, the threshold is a minimum of tC and a fixed threshold, where tC is a variable and where the fixed threshold is determined by the bit depth.

According to a second aspect, a method for deblocking is provided. The method includes checking whether a size of a current block exceeds a size threshold. The method includes checking whether a size of an adjacent block exceeds the size threshold. The adjacent block is adjacent to a boundary of the current block. The method includes determining that a criteria is true, wherein the criteria comprises (1) both a size of the current block and a size of the adjacent block exceeding the size threshold and (2) first and second differences being less than a threshold. The first difference is a difference between a first average value of the current block and a second average value of the adjacent block and the second difference is a difference between a third average value of the current block and a fourth average value of the adjacent block. The method includes, as a result of determining that the criteria is true, applying a long-tap deblocking across the boundary of the current block. A length of the long-tap deblocking is greater than or equal to 15.

According to a third aspect, a computer program is provided, comprising instructions which when executed by processing circuitry of a node, causes the node to perform the method of any of the embodiments of the first and second aspects.

According to a fourth aspect, a carrier is provided, containing the computer program of the third aspect. The carrier is one of an electronic signal, an optical signal, a radio signal, and a computer readable storage medium.

According to a fifth aspect, an encoder is provided. The encoder includes processing circuitry. The encoder includes a memory, the memory containing instructions executable by the processing circuitry. When the instructions are executed, the encoder is configured to perform the method of any one the embodiments of the first and second aspects.

According to a sixth aspect, a decoder is provided. The decoder includes processing circuitry. The decoder includes a memory, the memory containing instructions executable by the processing circuitry. When the instructions are executed, the encoder is configured to perform the method of any one the embodiments of the first and second aspects.

BRIEF DESCRIPTION OF THE DRAWINGS

The accompanying drawings, which are incorporated herein and form part of the specification, illustrate various embodiments.

DETAILED DESCRIPTION

Figure 1:
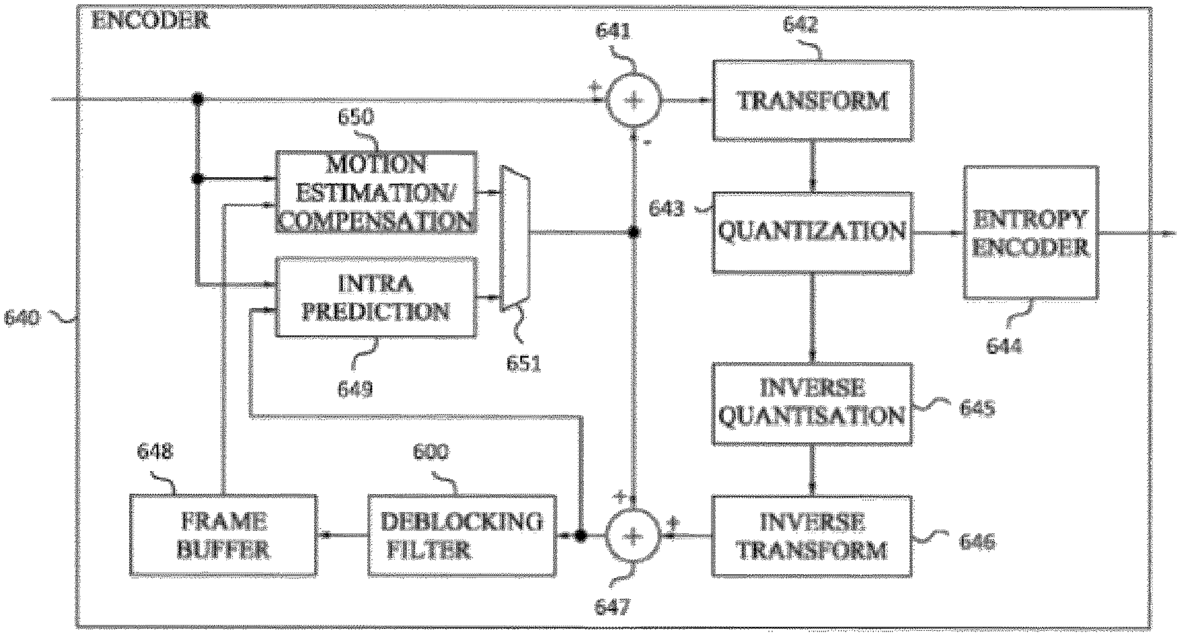
FIG. 1 is an example architecture of an encoder according to an embodiment.
Figure 2:
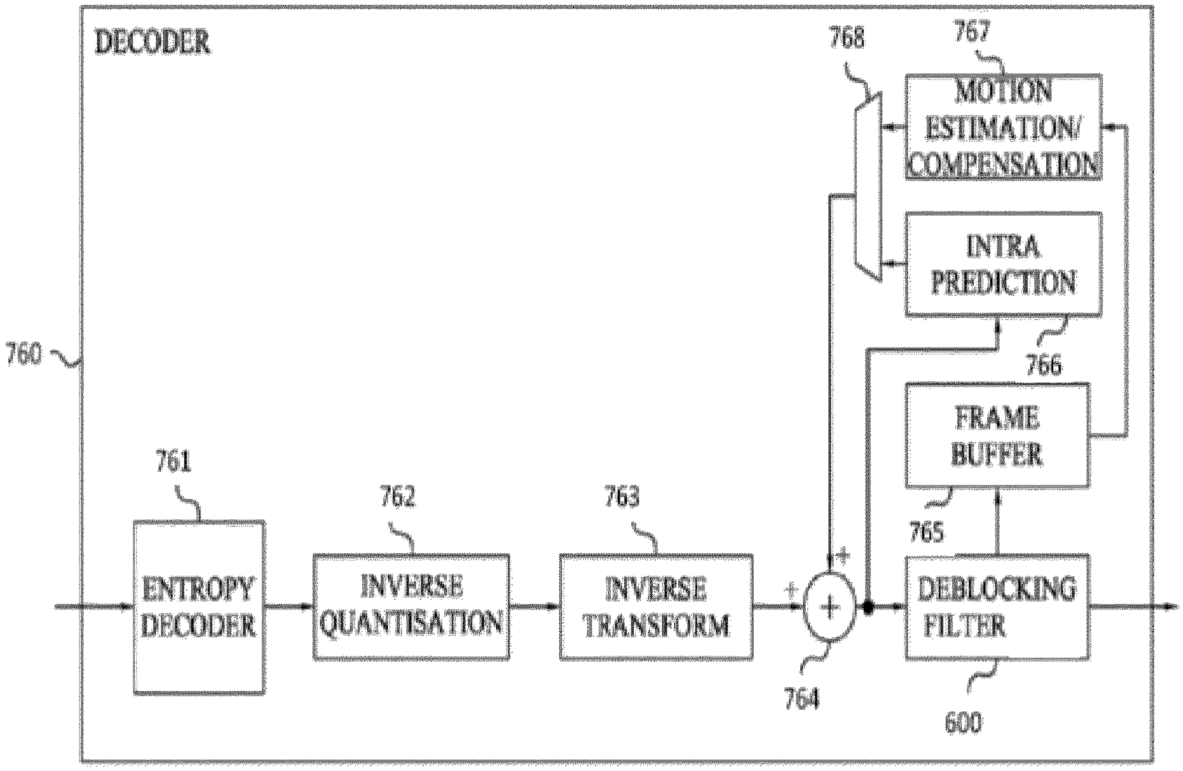
FIG. 2 is an example architecture of a decoder according to an embodiment.

One aspect of some embodiments is to provide decisions for when to enable the long deblocking filters, particularly for filters having a length of 15 or greater. The decisions can also be aligned with the VVC design. Embodiments may be used with image and video encoding and decoding where it can enhance deblocking. An exemplary encoder is shown in FIG. 1, and an exemplary decoder is shown in FIG. 2, both of which use deblocking as illustrated. Other in-loop tools may be performed before or after the deblocking, but other in-loop filters are not included in FIG. 1 and FIG. 2. Embodiments could also be applied as a post-filter outside the coding loop but before display. However, in that case, coding artifacts may appear inside large blocks since they are not removed from the coding/decoding loop.

Embodiments extend the work the inventors previously contributed toward providing extra-long deblocking filtering. In particular, embodiments provide additional checks for determining when to apply such filtering, and are applicable to any embodiments for providing extra-long deblocking filtering by providing additional criteria for such filtering. Examples of where the additional checks may be useful include embodiments that base filtering decisions on smoothness related criteria, or on size related criteria, or some combination of these or other criteria.

Figure 3A:
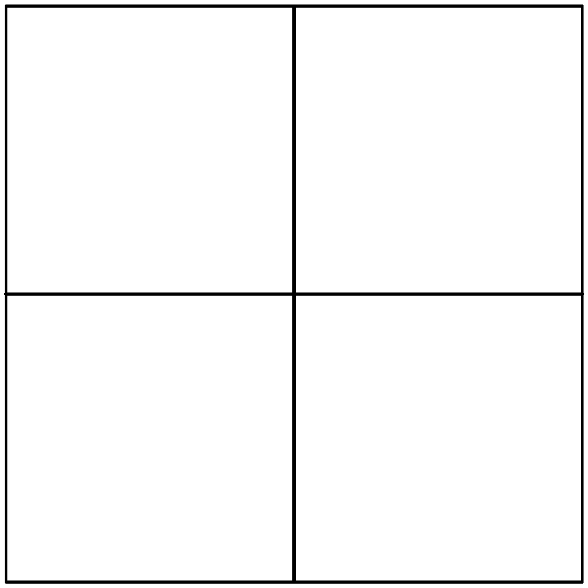
FIGS. 3A and 3B are exemplary diagrams of image blocks.
Figure 3B:
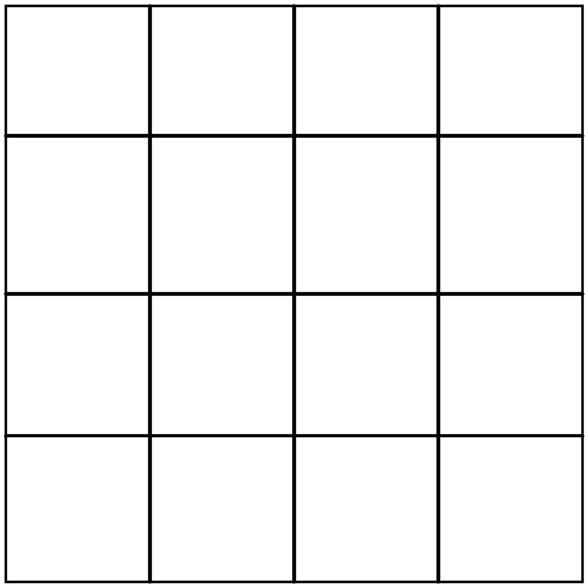

Blocks may have any particular size, but usually they are of uniform size to each other, and square. For example, FIG. 3A illustrates an exemplary division of a coding tree unit of 256×256 into 4 128×128 blocks and FIG. 3B illustrates an exemplary division of a coding tree unit of 256×256 into 16 64×64 blocks.

Figure 4:
FIG. 4 is an exemplary diagram of a block boundary segment.

FIG. 4 illustrates 4 lines extending 16 samples on each side of a block boundary 402. Samples are shown from a block P (404) and a block Q (406). Samples are denoted as $p_0$ (samples from block P) or $q_{i,j}$ (samples from block Q) according to their position in the block, as indexed by (i,j) which denote column and row information. Although block boundary 402 denotes a horizontal boundary in this figure, block boundary 402 may also indicate other boundaries, such as a vertical boundary.

Embodiment 1

When block sizes on either P or Q side of a block boundary 402 allows for a 15-tap or larger deblocking filter and the checks on the parameters sp0L15, sq0L15, dp0L15, dq0L15, sp3L15, sq3L15, dp3L15, and dq3L15 return true, additional decision criteria are applied. The two following conditions must be true:

$$\mathrm{Abs}(avgP0 - avgQ0) < \min(tC,\ fixedThreshold)$$

$$\mathrm{Abs}(avgP3 - avgQ3) < \min(tC,\ fixedThreshold)$$

$$\text{Where: } avgP0 = \frac{\sum_{i=0}^{lenP} p_{i,0}}{lenP+1},\ avgP3 = \frac{\sum_{i=0}^{lenP} p_{i,3}}{lenP+1},$$

$$avgQ0 = \frac{\sum_{i=0}^{lenQ} q_{i,0}}{lenQ+1},\ \text{and } avgQ3 = \frac{\sum_{i=0}^{lenQ} q_{i,3}}{lenQ+1}.$$

The value fixedThreshold is a threshold based on the bit-depth. For example, fixedThreshold may be 21 when bit-depth is 10, and for higher bit-depth the fixedThreshold may be amplified appropriately as fixedThreshold*(1<<(bitDepth-10)). For lower bit-depth the threshold may be attenuated as fixedThreshold>>(10-bitDepth). The value lenP is equal to maxFilterLengthP and the value lenQ is equal to maxFilterLengthQ.

If the criteria are not fulfilled the filter decisions proceed as the filter process for 7-tap filters as in VVC specification.

Embodiment 2

The division can be avoided in embodiment 1 for avgP0, avgP3, avgQ0, and avgQ3 by using right bit shifts instead. For example:

$$avgP0 = \left(\sum_{i=0}^{maxFilterLengthP} p_{i,0} \mp ((\max FilterLengthP + 1) \gg 1)\right) \gg shiftVec[\mathrm{Max}FilterLengthP],$$

$$avgP3 = \left(\sum_{i=0}^{maxFilterLengthP} p_{i,3} \mp ((\max FilterLengthP + 1) \gg 1)\right) \gg shiftVec[\mathrm{Max}FilterLengthP],$$

$$avgQ0 = \left(\sum_{i=0}^{maxFilterLengthQ} q_{i,0} \mp ((\max FilterLengthQ + 1) \gg 1)\right) \gg shiftVec[\mathrm{Max}FilterLengthQ],\ \text{and}$$

$$avgQ3 = \left(\sum_{i=0}^{maxFilterLengthQ} q_{i,3} \mp ((\max FilterLengthQ + 1) \gg 1)\right) \gg shiftVec[\mathrm{Max}FilterLengthQ],$$

$$\text{where } shiftVec[16] = \{0, 1, 1, 2, 2, 2, 2, 3, 3, 3, 3, 3, 3, 3, 3, 4\}$$

Embodiment 3

The decision criteria are as in embodiment 1, where only every N: th sample is used to calculate avgP0, avgP3, avgQ0, and avgQ3:

$$avgP0 = \frac{N * \sum_{i=0,N,2*N,\ldots,maxFilterLengthP} p_{i,0}}{\max FilterLengthP + 1}$$

$$avgP3 = \frac{N * \sum_{i=0,N,2*N,\ldots,maxFilterLengthP} p_{i,3}}{\max FilterLengthP + 1}$$

$$avgQ0 = \frac{N * \sum_{i=0,N,2*N,\ldots,maxFilterLengthQ} q_{i,0}}{\max FilterLengthQ + 1},\ \text{and}$$

-continued $$avgQ3 = \frac{N * \sum_{i=0,N,2*N,\ldots,maxFilterLengthQ} q_{i,3}}{\max FilterLengthQ + 1}$$

Embodiment 4

The division can be avoided in embodiment 3 by using right bit shifts instead of divisions where N is equal to 2. For example:

$$avgP0 = \left(\sum_{i=0,2,4,,maxFilterLengthP} p_{i,0} \mp ((\max FilterLengthP + 1) \gg 2)\right) \gg shiftVec[\max FilterLengthP],$$

$$avgP3 = \left(\sum_{i=0,2,4,,maxFilterLengthP} p_{i,3} + ((\max FilterLengthP + 1) \gg 2)\right) \gg shiftVec[\max FilterLengthP],$$

$$avgQ0 = \left(\sum_{i=0,2,4,,maxFilterLengthQ} q_{i,0} \mp ((\max FilterLengthQ + 1) \gg 2)\right) \gg shiftVec[\max FilterLengthQ], \text{ and}$$

$$avgQ3 = \left(\sum_{i=0,2,4,,maxFilterLengthQ} q_{i,3} \mp ((\max FilterLengthQ + 1) \gg 2)\right) \gg shiftVec[\max FilterLengthQ],$$

$$\text{where } shiftVec[16] = \{0, 0, 1, 1, 1, 1, 2, 2, 2, 2, 2, 2, 2, 2, 3, 3\}.$$

Embodiment 5

This embodiment relates to the filtering. To calculate refMiddle when one side uses longer filtering it is needed to select samples to use for the calculation. Corresponding criteria in VVC can be changed according to the italicized text below:

. . .

Otherwise, if maxFilterLengthP is equal to maxFilterLengthQ and maxFilterLengthP is not equal to 5, or maxFilterLengthP is equal to 7 and maxFilterLengthQ is equal to 15, or maxFilterLengthP is equal to 15 and maxFilterLengthQ is equal to 7, the following applies:

$$refMiddle = (p_6 + p_5 + p_4 + p_3 + p_2 + p_1 + 2*(p_0 + q_0) + q_1 + q_2 + q_3 + q_4 + q_5 + q_6 + 8) \gg 4 \quad (118)$$

. . .

Otherwise, if one of the following conditions is true:

- maxFilterLengthQ is equal to 7 or greater than 7_and maxFilterLengthP is equal to 5,
- maxFilterLengthQ is equal to 5 and maxFilterLengthP is equal to 7 or greater than 7, the following applies:

$$refMiddle = (p_5 + p_4 + p_3 + p_2 + 2*(p_1 + p_0 + q_0 + q_1) + q_2 + q_3 + q_4 + q_5 + 8) \gg 4 \quad (119)$$

. . .

Otherwise, if maxFilterLengthQ is equal to 7 or greater than 7 and maxFilterLengthP is equal to 3, the following applies:

$$refMiddle = (2*(p_2 + p_1 + p_0 + q_0) + p_0 + p_1 + q_1 + q_2 + q_3 + q_4 + q_5 + q_6 + 8) \gg 4 \quad (120)$$

Figure 5:
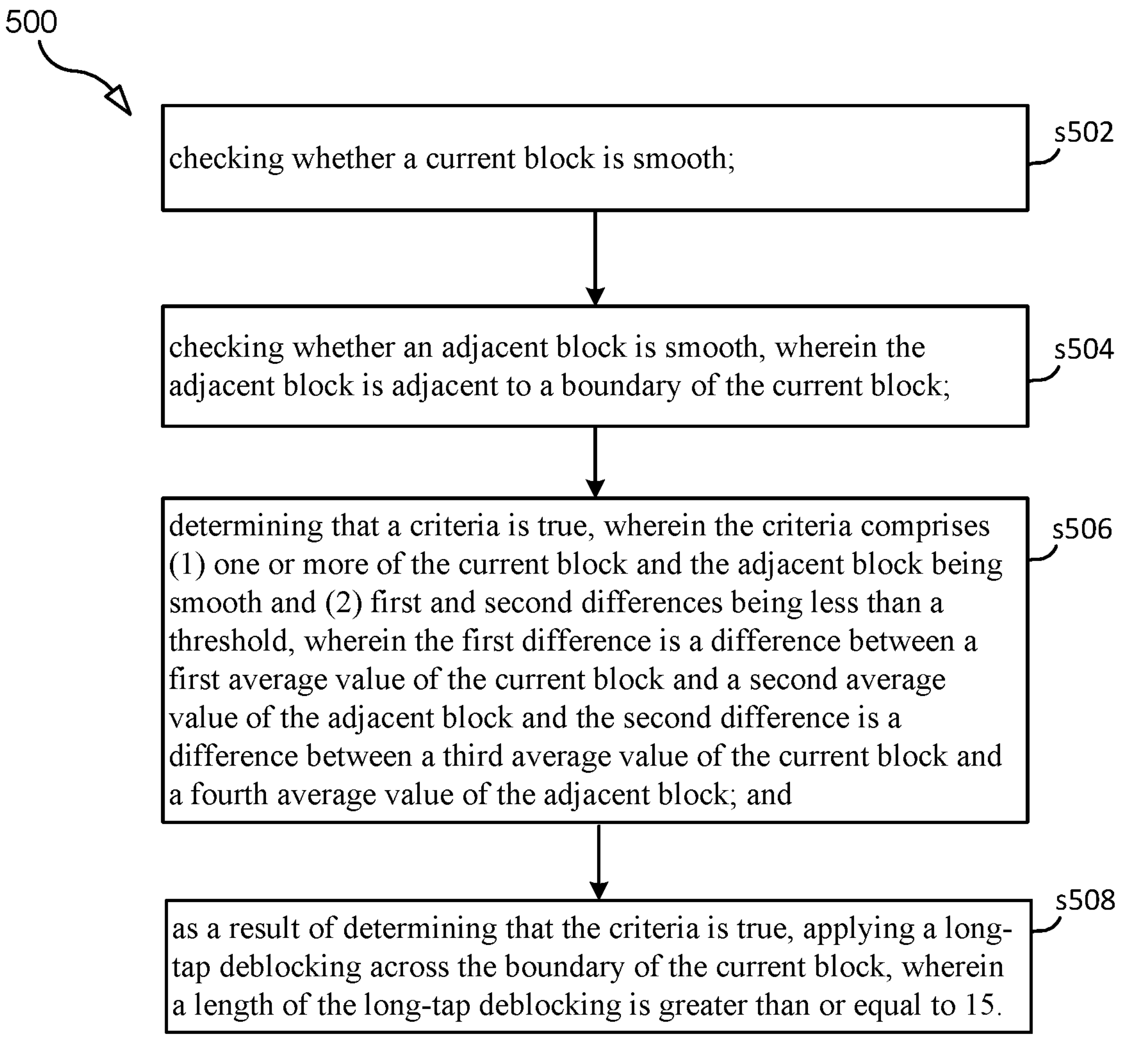
FIG. 5 is a flow chart according to an embodiment.

FIG. 5 illustrates a flow chart according to an embodiment. Process 500 is a method for deblocking. The method may begin with step s502.

Step s502 comprises checking whether a current block is smooth.

Step s504 comprises checking whether an adjacent block is smooth, wherein the adjacent block is adjacent to a boundary of the current block.

Step s506 comprises determining that a criteria is true, wherein the criteria comprises (1) one or more of the current block and the adjacent block being smooth and (2) first and second differences being less than a threshold, wherein the first difference is a difference between a first average value of the current block and a second average value of the adjacent block and the second difference is a difference between a third average value of the current block and a fourth average value of the adjacent block.

Step s508 comprises, as a result of determining that the criteria is true, applying a long-tap deblocking across the boundary of the current block, wherein a length of the long-tap deblocking is greater than or equal to 15.

In some embodiments, the first average value (avgP0), second average value (avgQ0), third average value (avgP3), and fourth average value (avgQ3) are given by:

$$avgP0 = \frac{\sum_{i=0}^{lenP} p_{i,0}}{lenP + 1},\ avgP3 = \frac{\sum_{i=0}^{lenP} p_{i,3}}{lenP + 1},$$

$$avgQ0 = \frac{\sum_{i=0}^{lenQ} q_{i,0}}{lenQ + 1}, \text{ and } avgQ3 = \frac{\sum_{i=0}^{lenQ} q_{i,3}}{lenQ + 1},$$

where lenP is equal to maxFilterLengthP, the maximum filter length of the current block, lenQ is equal to maxFilterLengthQ, the maximum filter length of the adjacent block, $P_{i,0}$ and $P_{i,3}$ refer to values in the current block indexed by i and $q_{i,0}$ and $q_{i,3}$ refer to values in the adjacent block indexed by i. In some embodiments, the first average value (avgP0), second average value (avgQ0), third average value (avgP3), and fourth average value (avgQ3) are calculated using bit shifts to avoid a division operator being used.

In some embodiments, the first average value (avgP0), second average value (avgQ0), third average value (avgP3), and fourth average value (avgQ3) are averaged over every N-th sample for a value of N and given by:

$$avgP0 = \frac{N * \sum_{i=0,N,2*N,\ldots,maxFilterLengthP} p_{i,0}}{\max FilterLengthP + 1},$$

$$avgP3 = \frac{N * \sum_{i=0,N,2*N,\ldots,maxFilterLengthP} p_{i,3}}{\max FilterLengthP + 1},$$

$$avgQ0 = \frac{N * \sum_{i=0,N,2*N,\ldots,maxFilterLengthQ} q_{i,0}}{\max FilterLengthQ + 1},$$

$$\text{and } avgQ3 = \frac{N * \sum_{i=0,N,2*N,\ldots,maxFilterLengthQ} q_{i,3}}{\max FilterLengthQ + 1},$$

where maxFilterLengthP is the maximum filter length of the current block, maxFilterLengthQ is the maximum filter length of the adjacent block, $p_{i,0}$ and $p_{i,3}$ refer to values in the current block indexed by i and $q_{i,0}$ and $q_{i,3}$ refer to values in the adjacent block indexed by i.

In some embodiments, the first average value (avgP0), second average value (avgQ0), third average value (avgP3), and fourth average value (avgQ3) are calculated using bit shifts to avoid a division operator being used. In some embodiments, the threshold is a minimum of tC and a fixed threshold, where tC is a variable and where the fixed threshold is determined by the bit depth.

Figure 6:
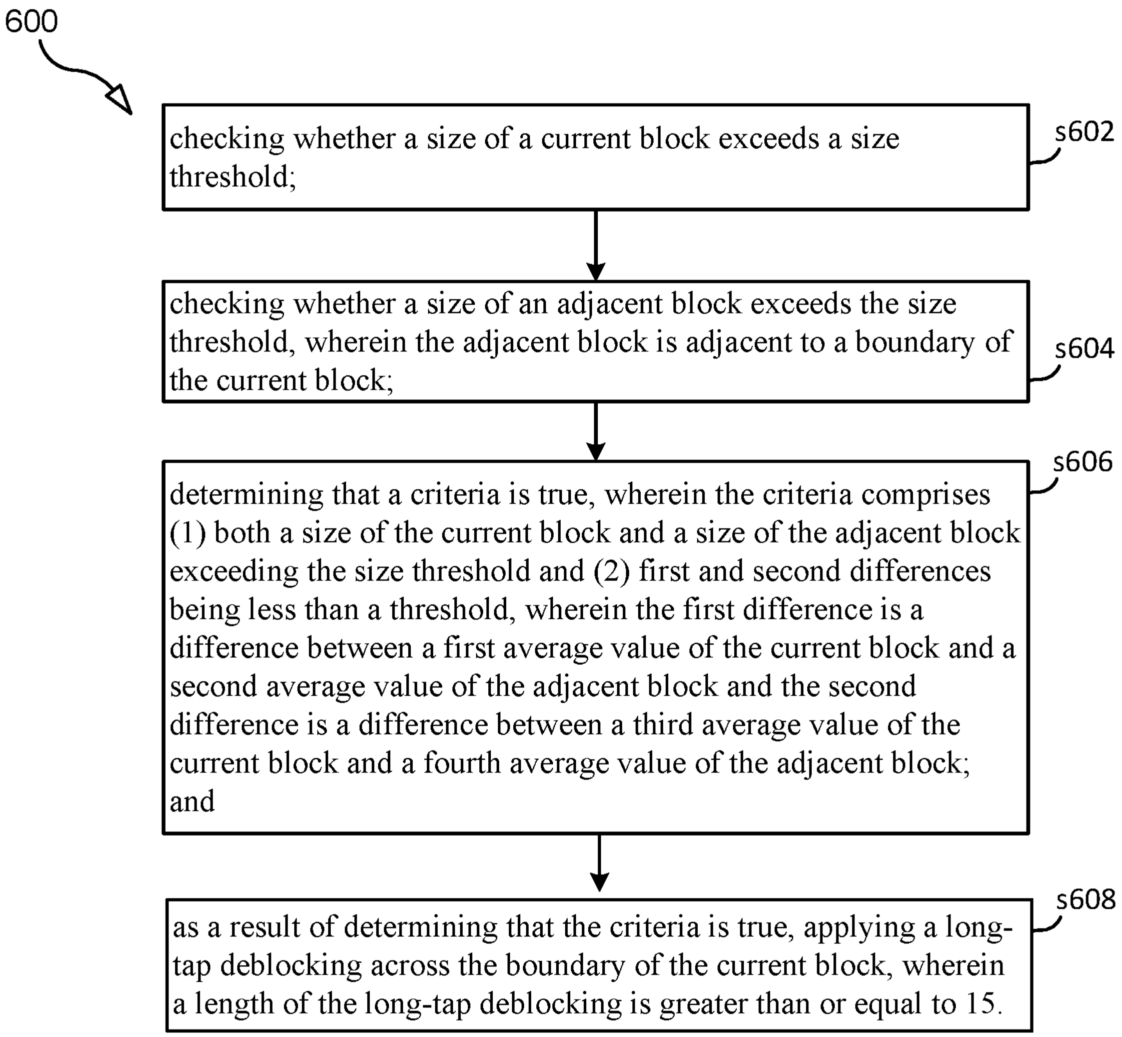
FIG. 6 is a flow chart according to an embodiment.

FIG. 6 illustrates a flow chart according to an embodiment. Process 600 is a method for deblocking. The method may begin with step s602.

Step s602 comprises checking whether a size of a current block exceeds a size threshold.

Step s604 comprises checking whether a size of an adjacent block exceeds the size threshold, wherein the adjacent block is adjacent to a boundary of the current block.

Step s606 comprises determining that a criteria is true, wherein the criteria comprises (1) both a size of the current block and a size of the adjacent block exceeding the size threshold and (2) first and second differences being less than a threshold, wherein the first difference is a difference between a first average value of the current block and a second average value of the adjacent block and the second difference is a difference between a third average value of the current block and a fourth average value of the adjacent block.

Step s608 comprises, as a result of determining that the criteria is true, applying a long-tap deblocking across the boundary of the current block, wherein a length of the long-tap deblocking is greater than or equal to 15.

Figure 7:
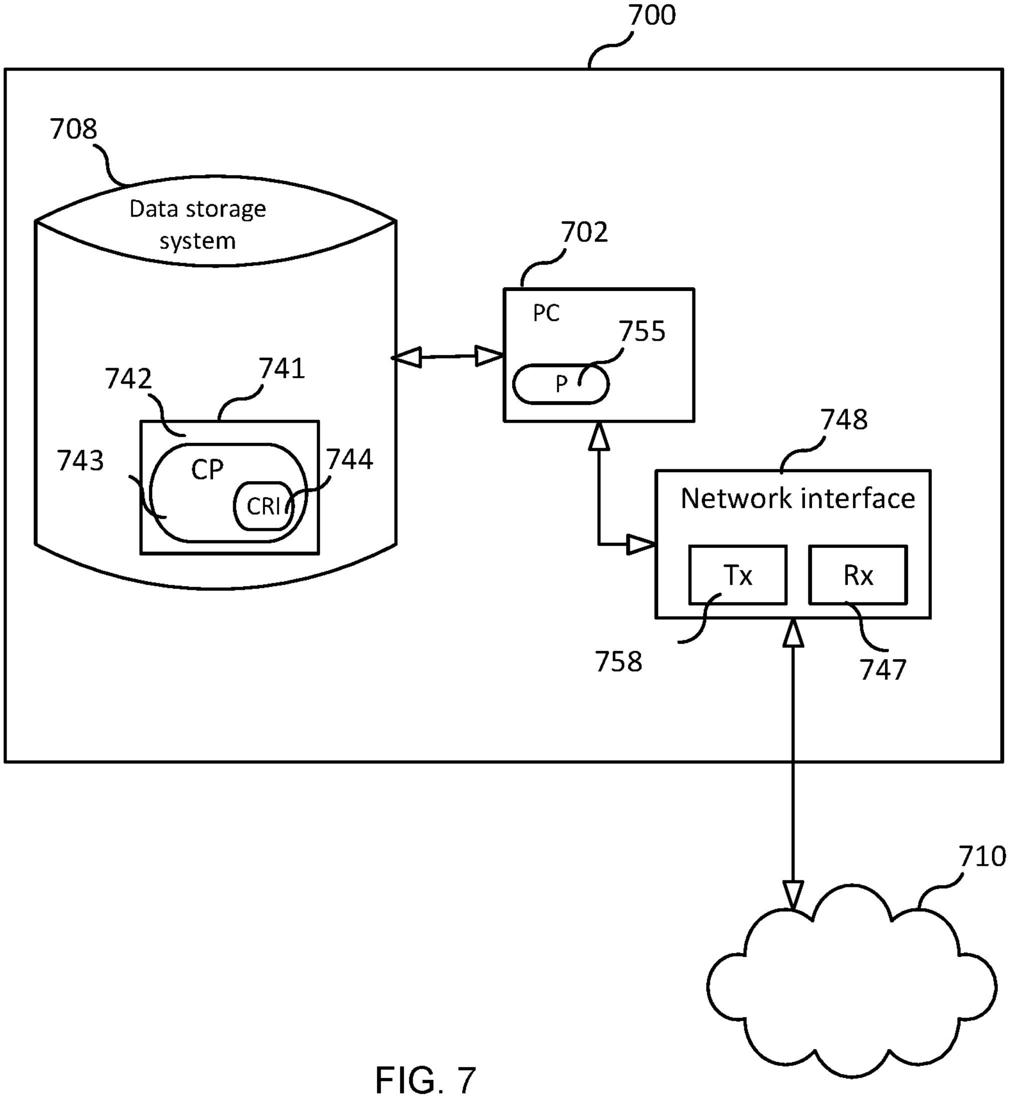
FIG. 7 is a block diagram of a node (e.g., an encoder or decoder) according to an embodiment.

FIG. 7 is a block diagram of node 700 (e.g., an encoder or decoder), according to some embodiments. As shown in FIG. 7, node 700 may comprise: processing circuitry (PC) 702, which may include one or more processors (P) 755 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., node 700 may be a distributed computing apparatus); at least one network interface 748 (e.g., a physical interface or air interface) comprising a transmitter (Tx) 745 and a receiver (Rx) 747 for enabling node 700 to transmit data to and receive data from other nodes connected to a network 710 (e.g., an Internet Protocol (IP) network) to which network interface 748 is connected (physically or wirelessly) (e.g., network interface 748 may be coupled to an antenna arrangement comprising one or more antennas for enabling node 700 to wirelessly transmit/receive data); and a local storage unit (a.k.a., "data storage system") 708, which may include one or more non-volatile storage devices and/or one or more volatile storage devices. In embodiments where PC 702 includes a programmable processor, a computer program product (CPP) 741 may be provided. CPP 741 includes a computer readable medium (CRM) 742 storing a computer program (CP) 743 comprising computer readable instructions (CRI) 744. CRM 742 may be a non-transitory computer readable medium, such as, magnetic media (e.g., a hard disk), optical media, memory devices (e.g., random access memory, flash memory), and the like. In some embodiments, the CRI 744 of computer program 743 is configured such that when executed by PC 702, the CRI causes node 700 to perform steps described herein (e.g., steps described herein with reference to the flow charts). In other embodiments, node 700 may be configured to perform steps described herein without the need for code. That is, for example, PC 702 may consist merely of one or more ASICs. Hence, the features of the embodiments described herein may be implemented in hardware and/or software.

As used herein, a network element, node, or subsystem (e.g., an encoder or decoder) may be comprised of one or more pieces of service network equipment, including hardware and software that communicatively interconnects other equipment on a network (e.g., other network elements, end stations, etc.), and is adapted to host one or more applications or services, either in a virtualized/non-virtualized environment, with respect to a plurality of subscribers and associated user equipment (UE) nodes that are operative to receive/consume content in a media distribution network where media content assets may be distributed and delivered using stream-based or file-based mechanisms. As such, some network elements may be disposed in a wireless radio network environment whereas other network elements may be disposed in a public packet-switched network infrastructure, including or otherwise involving suitable content delivery network (CDN) infrastructure that may comprise public, private, or mixed CDNs. Further, suitable network elements including one or more embodiments set forth herein may involve terrestrial and/or satellite broadband delivery infrastructures, e.g., a Digital Subscriber Line (DSL) network architecture, a Data Over Cable Service Interface Specification (DOCSIS)-compliant Cable Modem Termination System (CMTS) architecture, switched digital video (SDV) network architecture, a Hybrid Fiber-Coaxial (HFC) network architecture, a suitable satellite access network architecture or a broadband wireless access network architecture over cellular and/or WiFi connectivity. Accordingly, some network elements may comprise "multiple services network elements" that provide support for multiple network-based functions (e.g., 360° immersive A/V media preparation delivery policy management, session control, QoS policy enforcement, bandwidth scheduling management, content provider priority policy management, streaming policy management, and the like), in addition to providing support for multiple application services (e.g., data and multimedia applications including 360° immersive video assets (also referred to as 360-degree video assets or simply 360 video assets) in varying qualities or definitions). Example subscriber end stations or client devices may comprise various devices, tethered or untethered, that may consume or deliver media content assets using streaming and/or file-based downloading technologies, which may involve some type of rate adaptation in certain embodiments. Illustrative client devices or UE devices may therefore include any device configured to execute, inter alia, one or more client applications for receiving, recording, storing, and/or decoding/rendering 360 video content, live media and/or static/on-demand media, which may comprise Virtual Reality (VR) media, Augmented Reality (AR) media, Mixed Reality (MR) media, from one or more content providers, e.g., via a broadband access network, using HTTP, HTTPS, RTP, and the like. Accordingly, such client devices may include Next Generation IP-based STBs, networked TVs, personal/digital video recorders (PVR/DVRs), networked media projectors, portable laptops, netbooks, palm tops, tablets, smartphones, multimedia/video phones, mobile/wireless user equipment, portable media players, portable gaming systems or consoles (such as the Wii®, Play Station 3®, etc.) operating in concert with 3D display devices and the like, which may access or consume 360-degree content/services provided via a suitable media distribution network wherein a bandwidth and Quality of Experience (QoE) scheme may be provided in accordance with to one or more embodiments set forth herein.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals-such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Skilled artisans will recognize that the foregoing generalized example network environment may be implemented in a hierarchical network architecture, with various aspects of media capture and preparation, including, e.g., source stream stitching, projection mapping, source media compression, tiled/ABR encoding/transcoding, packaging, etc., as well as distributing/uploading and edge node processes taking place in different network portions disposed at different hierarchical levels, involving one or more operators, content delivery networks (CDNs), edge networks, and the like. Further, in some implementations, at least some of the foregoing apparatuses and processes may be cloud-based. In some arrangements, a CDN can be a large distributed system of servers deployed in multiple data centers connected to the Internet or other public/private communications network. A CDN can be a managed or unmanaged network, and can also be a federation of managed or unmanaged networks.

An example embodiment of a media server/source system operatively associated within the foregoing example network environment may therefore be configured, e.g., as a global headend, to accept media content from live sources and/or static file sources, e.g., online content providers such as Hulu®, Netflix®, YouTube®, or Amazon® Prime, as well as VOD catalog or content providers or studios such as, e.g., Disney, Warner, Sony, etc. Media content from live sources may comprise live programming captured relative to any type of event, e.g., sporting/entertainment/gaming events, concerts, live TV shows, live news broadcasting sources, such as, for instance, national broadcasters (e.g., NBC, ABC, etc.) as well as cable broadcaster channels like Time Warner channels of CNN, ESPN, CNBC, etc., and local broadcasters, etc., including any secondary media insertions such as advertisement media channels.

Summary of Various Embodiments

A1. A method for deblocking, the method comprising:

checking whether a current block is smooth;

checking whether an adjacent block is smooth, wherein the adjacent block is adjacent to a boundary of the current block;

determining that a criteria is true, wherein the criteria comprises (1) one or more of the current block and the adjacent block being smooth and (2) first and second differences being less than a threshold, wherein the first difference is a difference between a first average value of the current block and a second average value of the adjacent block and the second difference is a difference between a third average value of the current block and a fourth average value of the adjacent block; and as a result of determining that the criteria is true, applying a long-tap deblocking across the boundary of the current block, wherein a length of the long-tap deblocking is greater than or equal to 15.

A2. The method of embodiment A1, wherein the first average value (avgP0), second average value (avgQ0), third average value (avgP3), and fourth average value (avgQ3) are given by:

$$avgP0 = \frac{\sum_{i=0}^{lenP} p_{i,0}}{lenP + 1}$$

$$avgP3 = \frac{\sum_{i=0}^{lenP} p_{i,3}}{lenP + 1}$$

$$avgQ0 = \frac{\sum_{i=0}^{lenQ} q_{i,0}}{lenQ + 1}$$

$$avgQ3 = \frac{\sum_{i=0}^{lenQ} q_{i,3}}{lenQ + 1}$$

where lenP is equal to maxFilterLengthP, the maximum filter length of the current block, lenQ is equal to maxFilterLengthQ, the maximum filter length of the adjacent block, $P_{i,0}$ and $P_{i,3}$ refer to values in the current block indexed by i and $q_{i,0}$ and $q_{i,3}$ refer to values in the adjacent block indexed by i.

A3. The method of embodiment A2, wherein the first average value (avgP0), second average value (avgQ0), third average value (avgP3), and fourth average value (avgQ3) are calculated using bit shifts to avoid a division operator being used.

A4. The method of embodiment A1, wherein the first average value (avgP0), second average value (avgQ0), third average value (avgP3), and fourth average value (avgQ3) are averaged over every N-th sample for a value of N and given by:

$$avgP0 = \frac{N * \sum_{i=0,N,2*N,\ldots,maxFilterLengthP} p_{i,0}}{\max FilterLengthP + 1}$$

-continued $$avgP3=\frac{N*\sum_{i=0,N,2*N,\ldots,maxFilterLengthP}p_{i,3}}{maxFilterLengthP+1}$$

$$avgQ0=\frac{N*\sum_{i=0,N,2*N,\ldots,maxFilterLengthQ}q_{i,0}}{maxFilterLengthQ+1}$$

$$avgQ3=\frac{N*\sum_{i=0,N,2*N,\ldots,maxFilterLengthQ}q_{i,3}}{maxFilterLengthQ+1}$$

where maxFilterLengthP is the maximum filter length of the current block, maxFilterLengthQ is the maximum filter length of the adjacent block, $p_{i,0}$ and $p_{i,3}$ refer to values in the current block indexed by i and $q_{i,0}$ and $q_{i,3}$ refer to values in the adjacent block indexed by i.

A5. The method of embodiment A4, wherein the first average value (avgP0), second average value (avgQ0), third average value (avgP3), and fourth average value (avgQ3) are calculated using bit shifts to avoid a division operator being used.

A6. The method of any one of embodiments A1-A5, wherein the threshold is a minimum of tC and a fixed threshold, where tC is a variable and where the fixed threshold is determined by the bit depth.

B1. A method for deblocking, the method comprising:

checking whether a size of a current block exceeds a size threshold;

checking whether a size of an adjacent block exceeds the size threshold, wherein the adjacent block is adjacent to a boundary of the current block;

determining that a criteria is true, wherein the criteria comprises (1) both a size of the current block and a size of the adjacent block exceeding the size threshold and (2) first and second differences being less than a threshold, wherein the first difference is a difference between a first average value of the current block and a second average value of the adjacent block and the second difference is a difference between a third average value of the current block and a fourth average value of the adjacent block; and as a result of determining that the criteria is true, applying a long-tap deblocking across the boundary of the current block, wherein a length of the long-tap deblocking is greater than or equal to 15.

B2. The method of embodiment B1, wherein the first average value (avgP0), second average value (avgQ0), third average value (avgP3), and fourth average value (avgQ3) are given by:

$$avgP0=\frac{\sum_{i=0}^{lenP}p_{i,0}}{lenP+1}$$

$$avgP3=\frac{\sum_{i=0}^{lenP}p_{i,3}}{lenP+1}$$

$$avgQ0=\frac{\sum_{i=0}^{lenQ}q_{i,0}}{lenQ+1}$$

$$avgQ3=\frac{\sum_{i=0}^{lenQ}q_{i,3}}{lenQ+1}$$

where lenP is equal to maxFilterLengthP, the maximum filter length of the current block, lenQ is equal to maxFilterLengthQ, the maximum filter length of the adjacent block, $p_{i,0}$ and $P_{i,3}$ refer to values in the current block indexed by i and $q_{i,0}$ and $q_{i,3}$ refer to values in the adjacent block indexed by i.

B3. The method of embodiment B2, wherein the first average value (avgP0), second average value (avgQ0), third average value (avgP3), and fourth average value (avgQ3) are calculated using bit shifts to avoid a division operator being used.

B4. The method of embodiment B1, wherein the first average value (avgP0), second average value (avgQ0), third average value (avgP3), and fourth average value (avgQ3) are averaged over every N-th sample for a value of N and given by:

$$avgP0=\frac{N*\sum_{i=0,N,2*N,\ldots,maxFilterLengthP}p_{i,0}}{maxFilterLengthP+1}$$

$$avgP3=\frac{N*\sum_{i=0,N,2*N,\ldots,maxFilterLengthP}p_{i,3}}{maxFilterLengthP+1}$$

$$avgQ0=\frac{N*\sum_{i=0,N,2*N,\ldots,maxFilterLengthQ}q_{i,0}}{maxFilterLengthQ+1}$$

$$avgQ3=\frac{N*\sum_{i=0,N,2*N,\ldots,maxFilterLengthQ}q_{i,3}}{maxFilterLengthQ+1}$$

where maxFilterLengthP is the maximum filter length of the current block, maxFilterLengthQ is the maximum filter length of the adjacent block, $p_{i,0}$ and $p_{i,3}$ refer to values in the current block indexed by i and $q_{i,0}$ and $q_{i,3}$ refer to values in the adjacent block indexed by i.

B5. The method of embodiment B4, wherein the first average value (avgP0), second average value (avgQ0), third average value (avgP3), and fourth average value (avgQ3) are calculated using bit shifts to avoid a division operator being used.

B6. The method of any one of embodiments B1-B5, wherein the threshold is a minimum of tC and a fixed threshold, where tC is a variable and where the fixed threshold is determined by the bit depth.

C1. A computer program comprising instructions which when executed by processing circuitry of a node, causes the node to perform the method of any one of embodiments A1-A6, and B1-B6.

C2. A carrier containing the computer program of embodiment C1, wherein the carrier is one of an electronic signal, an optical signal, a radio signal, and a computer readable storage medium.

D1. An encoder, the encoder comprising:

processing circuitry; and a memory, the memory containing instructions executable by the processing circuitry, whereby the encoder is configured to perform the method of any one the embodiments A1-A6, and B1-B6.

D2. A decoder, the decoder comprising:

processing circuitry; and a memory, the memory containing instructions executable by the processing circuitry, whereby the decoder is configured to perform the method of any one the embodiments A1-A6, and B1-B6.

E1. An encoder configured to deblock, the encoder being further configured to:

check whether a current block is smooth;

check whether an adjacent block is smooth, wherein the adjacent block is adjacent to a boundary of the current block;

determine that a criteria is true, wherein the criteria comprises (1) one or more of the current block and the adjacent block being smooth and (2) first and second differences being less than a threshold, wherein the first difference is a difference between a first average value of the current block and a second average value of the adjacent block and the second difference is a difference between a third average value of the current block and a fourth average value of the adjacent block; and as a result of determining that the criteria is true, apply a long-tap deblocking across the boundary of the current block, wherein a length of the long-tap deblocking is greater than or equal to 15.

E2. The encoder of embodiment E1, wherein the encoder is further configured to perform the method of any one of embodiments A2-A6.

F1. An encoder configured to deblock, the encoder being further configured to:

check whether a size of a current block exceeds a size threshold;

check whether a size of an adjacent block exceeds the size threshold, wherein the adjacent block is adjacent to a boundary of the current block;

determine that a criteria is true, wherein the criteria comprises (1) both a size of the current block and a size of the adjacent block exceeding the size threshold and (2) first and second differences being less than a threshold, wherein the first difference is a difference between a first average value of the current block and a second average value of the adjacent block and the second difference is a difference between a third average value of the current block and a fourth average value of the adjacent block; and as a result of determining that the criteria is true, apply a long-tap deblocking across the boundary of the current block, wherein a length of the long-tap deblocking is greater than or equal to 15.

F2. The encoder of embodiment F1, wherein the encoder is further configured to perform the method of any one of embodiments B2-B6.

G1. A decoder configured to deblock, the decoder being further configured to:

check whether a current block is smooth;

check whether an adjacent block is smooth, wherein the adjacent block is adjacent to a boundary of the current block;

determine that a criteria is true, wherein the criteria comprises (1) one or more of the current block and the adjacent block being smooth and (2) first and second differences being less than a threshold, wherein the first difference is a difference between a first average value of the current block and a second average value of the adjacent block and the second difference is a difference between a third average value of the current block and a fourth average value of the adjacent block; and as a result of determining that the criteria is true, apply a long-tap deblocking across the boundary of the current block, wherein a length of the long-tap deblocking is greater than or equal to 15.

G2. The decoder of embodiment G1, wherein the decoder is further configured to perform the method of any one of embodiments A2-A6.

H1. A decoder configured to deblock, the decoder being further configured to:

check whether a size of a current block exceeds a size threshold;

check whether a size of an adjacent block exceeds the size threshold, wherein the adjacent block is adjacent to a boundary of the current block;

determine that a criteria is true, wherein the criteria comprises (1) both a size of the current block and a size of the adjacent block exceeding the size threshold and (2) first and second differences being less than a threshold, wherein the first difference is a difference between a first average value of the current block and a second average value of the adjacent block and the second difference is a difference between a third average value of the current block and a fourth average value of the adjacent block; and as a result of determining that the criteria is true, apply a long-tap deblocking across the boundary of the current block, wherein a length of the long-tap deblocking is greater than or equal to 15.

H2. The decoder of embodiment H1, wherein the decoder is further configured to perform the method of any one of embodiments B2-B6.

Enhanced Compression Model (ECM) can operate at a larger CTU and transform size than VVC. To enable stronger deblocking of large blocks it is proposed in some embodiments to increase the maximum deblocking length from 7 to 15 for a boundary segment that has a size orthogonal to the block boundary of 64 samples or more. The filter design is similar to the VVC deblocking design for length greater than 3. The deblocking decision for a longer filter (length 15 on at least one side) is checked if length 7 deblocking decisions are passed. The additional decision for length 15 is similar to VVC but uses more samples to ensure that the deblocking filter is not used when there is a risk to remove natural texture.

In some embodiments, subjective improvements can be seen on both SDR and HDR material especially at lower bitrates.

The deblocking design in VVC can handle deblocking up to length 7 on both sides of a block boundary. With the increase of CTU and transform size in ECM it also makes sense to increase the length of the deblocking filter.

Embodiments provide a filter decision for length 15 for luma. When a four samples block boundary segment has a size orthogonal to the block boundary of 64 or more samples and length 7 conditions are fulfilled, the following additional checks are made for line 0 and line 3 of a boundary segment, where k is line 0 or line 3:

$$((spL_k + sqL_k) < (\text{beta} \gg 6))\ \&\&\ (dpL_k + dqL_k) < (\text{beta} \gg 5))\ \&\&$$

$$(\text{abs}(avgP_k - avgQ_k) < \min(tC, 21))$$

Where:

$$spL_k = sqL_k = dpL_k = dqL_k = avgP_k = avgQ_k = 0$$

$$\text{if}(\max FilterLengthP > 7)\{$$

$$spL_k = spL_k + \text{abs}(p_{7,k} - p_{11,k}) + \text{abs}(p_{11,k} - p_{15,k})$$

$$dpL_k = dpL_k + \text{abs}(p_{6,k} - p_{7,k} - p_{8,k} + p_{9,k}) +$$

$$\text{abs}(p_{10,k} - 2 * p_{11,k} + p_{12,k}) + \text{abs}(p_{13,k} - 2 * p_{14,k} + p_{15,k})$$

$$\}$$

$$\text{if}(\max FilterLengthQ > 7)\{$$

-continued $$sqL_k = sqL_k + \text{abs}(q_{7,k} - q_{11,k}) + \text{abs}(q_{11,k} - q_{15,k})$$

$$dqL_k = dqL_k + \text{abs}(q_{6,k} - q_{7,k} - q_{8,k} + q_{9,k}) +$$

$$\text{abs}(q_{10,k} - 2 * q_{11,k} + q_{12,k}) + \text{abs}(q_{13,k} - 2 * q_{14,k} + q_{15,k})$$

$$\}$$

$$\text{for (int } j = 0;\ j < (\max FilterLengthQ + 1);\ j{+}{+})\{$$

$$avgQ_k \mathrel{+}= q_{j,k};$$

$$\}$$

$$avgQ_k = (avgQ_k + (\max FilterLengthQ + 1)/2)/(\max FilterLengthQ + 1);$$

$$\text{for (int } j = 0;\ j < (\max FilterLengthP + 1);\ j{+}{+})\{$$

$$avgP_k \mathrel{+}= p_{j,k};$$

$$\}$$

$$avgP_k = (avgP_k + (\max FilterLengthP + 1)/2)/(\max FilterLengthP + 1);$$

Embodiments provide a filter for length 15 for luma. The filtering follows the same spirit as in VVC but where a longer filter of length 15 can be used if the long filter decision in section 2.1 is fulfilled. Four lines k=0 to k=3 are filtered by linear interpolation as follows:

$$pi, k' = \text{Clip3}(pi, k - tC, pi, k - tC, (refMk * coeffsi + refPk * (64 - coeffsPi) + 32) \gg 6);$$

$$qj, k' = \text{Clip3}(qj, k - tC, qj, k - tC, (refMk * coeffsj + refQk * (64 - coeffsQj) + 32) \gg 6);$$

where refM, refP, refQ, coeffsP and coeffsQ follows VVC besides adding a length 15 interpolation filter:

$$coeffsP[15] = \{62, 58, 53, 49, 45, 41, 36, 32, 28, 23, 19, 15, 11, 6, 2\};$$

$$coeffsQ[15] = \{62, 58, 53, 49, 45, 41, 36, 32, 28, 23, 19, 15, 11, 6, 2\};$$

Where refMk is derived same as when at least one side has length 7. refPk and refQk are derived based on length on respective side.

Results of embodiments are provided below.

| | Random Access Main 10 Over ECM-4.0 | | | | |
|---|---|---|---|---|---|
| | Y | U | V | EncT | DecT |
| Class A1 | #VALUE! | #VALUE! | #VALUE! | #NUM! | #NUM! |
| Class A2 | #VALUE! | #VALUE! | #VALUE! | #NUM! | #NUM! |
| Class B | 0.03% | 0.02% | −0.16% | 99% | 88% |
| Class C | −0.01% | 0.04% | −0.05% | 104% | 106% |
| Class E | | | | | |
| Overall | #VALUE! | #VALUE! | #VALUE! | #NUM! | #NUM! |
| Class D | 0.00% | 0.00% | 0.10% | 105% | 107% |
| Class F | 0.00% | 0.02% | 0.07% | 104% | 99% |

| | Low delay B Main10 Over ECM-4.0 | | | | |
|---|---|---|---|---|---|
| | Y | U | V | EncT | DecT |
| Class A1 | | | | | |
| Class A2 | | | | | |
| Class B | #VALUE! | #VALUE! | #VALUE! | #NUM! | #NUM! |
| Class C | −0.04% | 0.14% | 0.31% | 104% | 102% |
| Class E | 0.04% | 0.18% | −0.45% | 107% | 100% |
| Overall | #VALUE! | #VALUE! | #VALUE! | #NUM! | #NUM! |
| Class D | −0.03% | 1.00% | 1.24% | 106% | 103% |
| Class F | #VALUE! | #VALUE! | #VALUE! | #NUM! | #NUM! |

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for deblocking, the method comprising:

checking whether a size of a current block exceeds a size threshold;

checking whether a size of an adjacent block exceeds the size threshold, wherein the adjacent block is adjacent to a boundary of the current block;

determining that a criteria is true, wherein the criteria comprises (1) both a size of the current block and a size of the adjacent block exceeding the size threshold and (2) first and second differences being less than a threshold, wherein the first difference is a difference between a first average value of the current block and a second average value of the adjacent block and the second difference is a difference between a third average value of the current block and a fourth average value of the adjacent block; and as a result of determining that the criteria is true, applying a long-tap deblocking across the boundary of the current block, wherein a length of the long-tap deblocking is greater than or equal to 15.

2. The method of claim 1, wherein the first average value (avgP0), second average value (avgQ0), third average value (avgP3), and fourth average value (avgQ3) are given by:

$$avgP0 = \frac{\sum_{i=0}^{lenP} p_{i,0}}{lenP + 1}$$

$$avgP3 = \frac{\sum_{i=0}^{lenP} p_{i,3}}{lenP + 1}$$

$$avgQ0 = \frac{\sum_{i=0}^{lenQ} q_{i,0}}{lenQ + 1}$$

$$avgQ3 = \frac{\sum_{i=0}^{lenQ} q_{i,3}}{lenQ + 1}$$

where lenP is equal to maxFilterLengthP, the maximum filter length of the current block, lenQ is equal to maxFilterLengthQ, the maximum filter length of the adjacent block, $p_{i,0}$ and $p_{i,3}$ refer to values in the current block indexed by i and $q_{i,0}$ and $q_{i,3}$ refer to values in the adjacent block indexed by i.

3. The method of claim 2, wherein the first average value (avgP0), second average value (avgQ0), third average value (avgP3), and fourth average value (avgQ3) are calculated using bit shifts to avoid a division operator being used.

4. The method of claim 1, wherein the first average value (avgP0), second average value (avgQ0), third average value (avgP3), and fourth average value (avgQ3) are averaged over every N-th sample for a value of N and given by:

$$avgP0 = \frac{N * \sum_{i=0,N,2*N,\ldots,maxFilterLengthP} p_{i,0}}{\max FilterLengthP + 1}$$

$$avgP3 = \frac{N * \sum_{i=0,N,2*N,\ldots,maxFilterLengthP} p_{i,3}}{\max FilterLengthP + 1}$$

$$avgQ0 = \frac{N * \sum_{i=0,N,2*N,\ldots,maxFilterLengthQ} q_{i,0}}{\max FilterLengthQ + 1}$$

$$avgQ3 = \frac{N * \sum_{i=0,N,2*N,\ldots,maxFilterLengthQ} q_{i,3}}{\max FilterLengthQ + 1}$$

where maxFilterLengthP is the maximum filter length of the current block, maxFilterLengthQ is the maximum filter length of the adjacent block, $p_{i,0}$ and $p_{i,3}$ refer to values in the current block indexed by i and $q_{i,0}$ and $q_{i,3}$ refer to values in the adjacent block indexed by i.

5. The method of claim 4, wherein the first average value ($avgP_0$), second average value (avgQ0), third average value (avgP3), and fourth average value (avgQ3) are calculated using bit shifts to avoid a division operator being used.

6. The method of claim 1, wherein the threshold is a minimum of tC and a fixed threshold, where tC is a variable and where the fixed threshold is determined by the bit depth.

7. An encoder or decoder, the encoder or decoder comprising:

processing circuitry; and a memory, the memory containing instructions executable by the processing circuitry, whereby the encoder or decoder is configured to deblock, the encoder or decoder being further configured to:

check whether a size of a current block exceeds a size threshold;

check whether a size of an adjacent block exceeds the size threshold, wherein the adjacent block is adjacent to a boundary of the current block;

determine that a criteria is true, wherein the criteria comprises (1) both a size of the current block and a size of the adjacent block exceeding the size threshold and (2) first and second differences being less than a threshold, wherein the first difference is a difference between a first average value of the current block and a second average value of the adjacent block and the second difference is a difference between a third average value of the current block and a fourth average value of the adjacent block; and as a result of determining that the criteria is true, apply a long-tap deblocking across the boundary of the current block, wherein a length of the long-tap deblocking is greater than or equal to 15.

* * * * *